US011479003B2

(12) United States Patent
Brown et al.

(10) Patent No.: US 11,479,003 B2
(45) Date of Patent: Oct. 25, 2022

(54) RECORD MAKING SYSTEM

(71) Applicant: Viryl Technologies Corp., Toronto (CA)

(72) Inventors: Chad W. T. Brown, Toronto (CA); Robert H. Brown, Ancaster (CA); James Hashmi, Toronto (CA); Michael Wybenga, Hamilton (CA)

(73) Assignee: Viryl Technologies Corp., Toronto (CA)

( * ) Notice: Subject to any disclaimer, the term of this patent is extended or adjusted under 35 U.S.C. 154(b) by 440 days.

(21) Appl. No.: 16/470,296

(22) PCT Filed: Dec. 15, 2017

(86) PCT No.: PCT/CA2017/051521
§ 371 (c)(1),
(2) Date: Jun. 17, 2019

(87) PCT Pub. No.: WO2018/107297
PCT Pub. Date: Jun. 21, 2018

(65) Prior Publication Data
US 2021/0283872 A1    Sep. 16, 2021

Related U.S. Application Data

(60) Provisional application No. 62/435,496, filed on Dec. 16, 2016.

(30) Foreign Application Priority Data

Dec. 16, 2016   (CA) ...................................... 2952059

(51) Int. Cl.
*B29D 17/00*        (2006.01)
*B29C 43/02*        (2006.01)
(Continued)

(52) U.S. Cl.
CPC .............. *B29D 17/00* (2013.01); *B29C 43/02* (2013.01); *B29C 43/36* (2013.01); *B29C 43/52* (2013.01);
(Continued)

(58) Field of Classification Search
CPC .... B29D 17/00; B29D 17/002; B29D 17/005; B29D 17/007; B29C 43/02; B29C 43/36;
(Continued)

(56) References Cited

U.S. PATENT DOCUMENTS 3,632,280 A * 1/1972 Palmer ................. B29D 17/002
425/451.7
3,663,136 A * 5/1972 Westermann ........... B29C 43/02
425/116
(Continued)

OTHER PUBLICATIONS

International Search Report dated Mar. 28, 2018 for International Application No. PCT/CA2017/051521.

*Primary Examiner* — Matthew J Daniels
*Assistant Examiner* — Gregory C. Grosso
(74) *Attorney, Agent, or Firm* — Young Basile Hanlon & MacFarlane, P.C.

(57)    ABSTRACT

The invention provides an improved record making system, the system having a puck former having an outlet, the puck former being movable between an automatic position and a semi-automatic position and adapted to periodically produce a puck and to deliver the puck to the outlet. The system further has a record former having a puck receiver, the record former adapted, upon delivery of the puck to the puck receiver, to automatically produce a record. The record former is positioned relative to the puck former and adapted such that, when the puck former is in the automatic position, the outlet of the puck former is coterminous with the puck receiver of the record former. When the puck former is in the (Continued)

semi-automatic position, the puck receiver is accessible by an operator to permit manual puck feeding.

13 Claims, 26 Drawing Sheets

(51) Int. Cl.
*B29C 43/36* (2006.01)
*B29C 43/52* (2006.01)
*B29C 69/00* (2006.01)
*B65G 57/04* (2006.01)
*B29K 27/06* (2006.01)

(52) U.S. Cl.
CPC ............ *B29C 69/001* (2013.01); *B65G 57/04* (2013.01); *B29K 2027/06* (2013.01)

(58) Field of Classification Search
CPC ..... B29C 43/52; B29C 69/001; B29C 45/263; B65G 57/04; B29K 2027/06
See application file for complete search history.

(56) References Cited

U.S. PATENT DOCUMENTS

| | | | | |
|---|---|---|---|---|
| 3,862,815 | A | | 1/1975 | Roczynski et al. |
| 4,005,965 | A | | 2/1977 | Roczynski et al. |
| 4,151,823 | A | * | 5/1979 | Grosse ................... F01M 11/03 123/196 A |
| 4,318,877 | A | * | 3/1982 | Smith ..................... B29C 43/02 264/107 |
| 2014/0345153 | A1 | * | 11/2014 | Pahwa .................. F26B 21/083 34/330 |

* cited by examiner

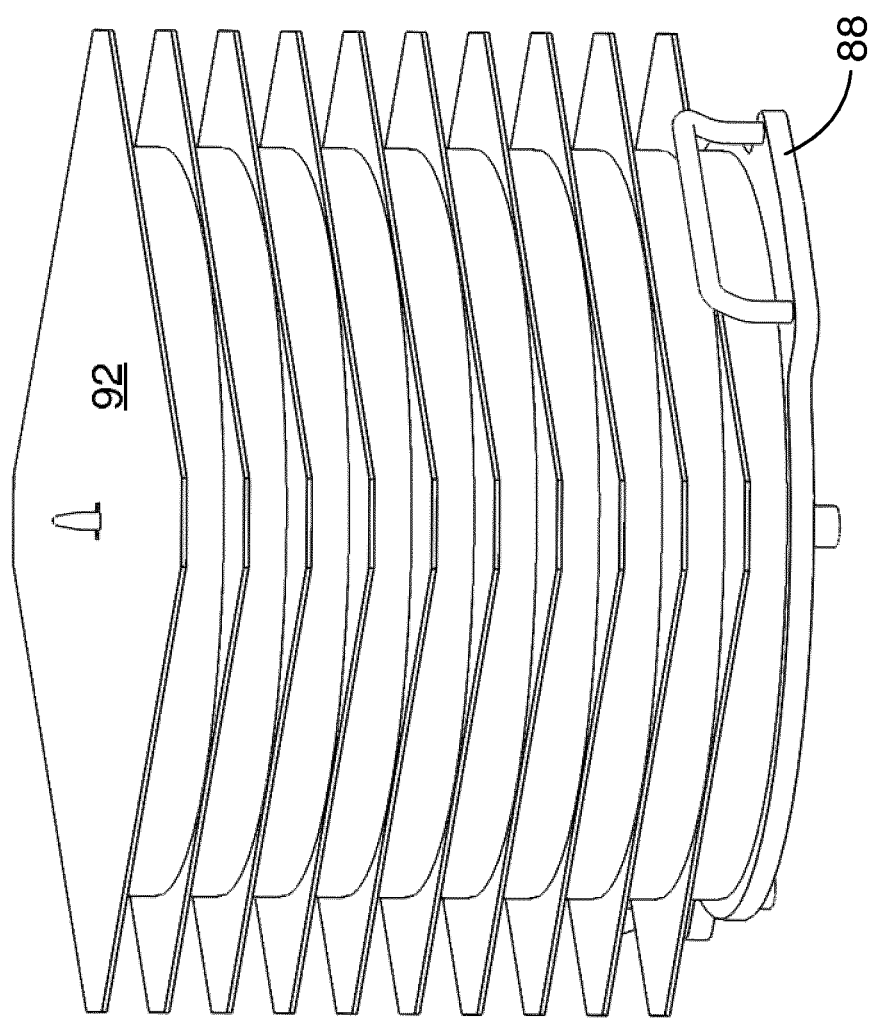

RECORD MAKING SYSTEM

FIELD OF THE INVENTION

The invention relates to the field of record making.

BACKGROUND OF THE INVENTION

Automated vinyl record duplication machines are known. They are designed to produce tens of thousands to hundreds of thousands of record copies of a given audio recording. Most, if not all, of the batches are traditionally produced in a single colour of polyvinyl chloride (PVC). The polyvinyl chloride is generally first molded into a vinyl "biscuit" or "puck", then the puck is pressed into a record. Given the increased demand for aesthetically "unique" and "limited edition" records, record makers commonly conduct secondary manipulations to the vinyl puck prior to the puck being pressed into a record. For example, operators will collect the vinyl puck from the extruder in a certain colour, add fragments of one or more different colour(s) of vinyl resin to the exterior of the puck, and then press the puck. As the colours meld together, a record with a unique pattern is produced.

Existing automated vinyl record machines are not designed to produce small batches (less than one thousand copies) of records of one given audio recording in colours of PVC that vary from batch to batch. In most cases, such automated machines do not allow for such customization without overriding safety features of the automated machine, which often pose a risk to the operator or damage the machine.

Non-fully-automatic vinyl record duplication machines are also known and facilitate the above-described type of manipulation of the puck. However, operation of the non-fully-automatic machines is cumbersome, since transporting and initiating each stage of the vinyl record making process must be done by hand by the operator. Such a system increases reliance on the operator and increases the amount of time required to produce a record.

SUMMARY OF THE INVENTION

Forming one aspect of the invention is an improved record making system, the system having a puck former having an outlet, the puck former being movable between an automatic position and a semi-automatic position and adapted to periodically produce a puck and to deliver the puck to the outlet. The system further has a record former having a puck receiver, the record former adapted, upon delivery of the puck to the puck receiver, to automatically produce a record. The record former is positioned relative to the puck former and adapted such that, when the puck former is in the automatic position, the outlet of the puck former is coterminous with the puck receiver of the record former. When the puck former is in the semi-automatic position, the puck receiver is accessible by an operator to permit manual puck feeding.

According to another aspect, when the puck former is in the automatic position, the puck former automatically forms the vinyl puck. When the puck former is in the semi-automatic position, the puck former forms the vinyl puck on demand.

According to another aspect, the puck former sits on rails for facilitating movement of the puck former between the automatic and semi-automatic position and for maintaining relative alignment between the puck former and the record former.

According to another aspect, a label cartridge is releasably coupled to the record former without tools.

According to another aspect, a trimming subsystem is pivotably connected to a press subsystem.

According to another aspect, a combination quick release mechanism releasably couples a stamper to the record former without common hand tools.

According to another aspect, the record former has multiple collection spindles.

Advantages, features and characteristics of the invention will become apparent upon review of the following detailed description and the appended drawings, the latter being briefly described hereinafter.

BRIEF DESCRIPTION OF THE DRAWINGS

FIG. 32 is a perspective view of the collection spindle of FIG. 31 alternatively stacked with records and cooling plates.

DETAILED DESCRIPTION

Figure 1:
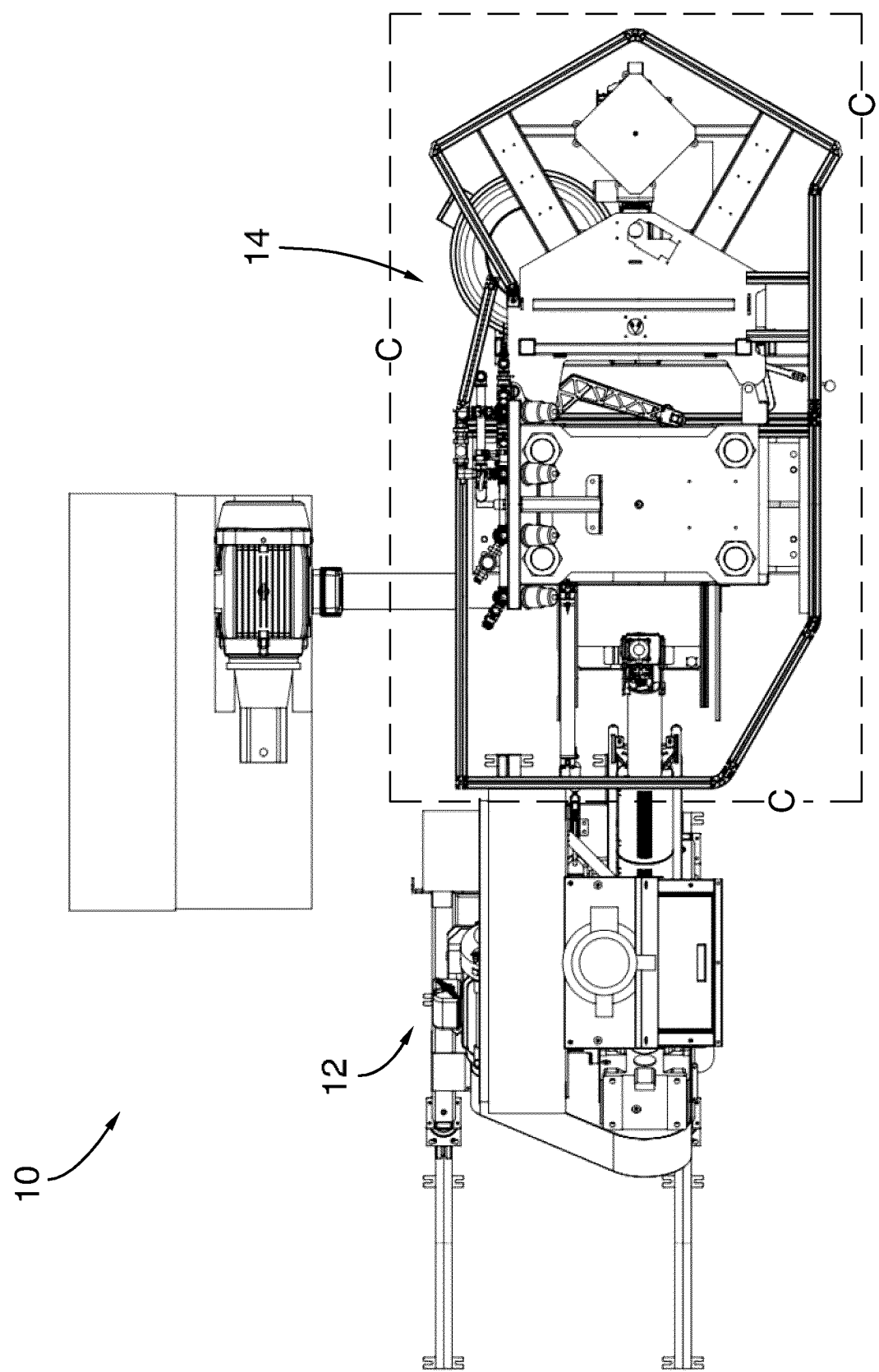
FIG. 1 is a top plan view of a record making system in an automatic position according to an exemplary embodiment of the invention.
Figure 2:
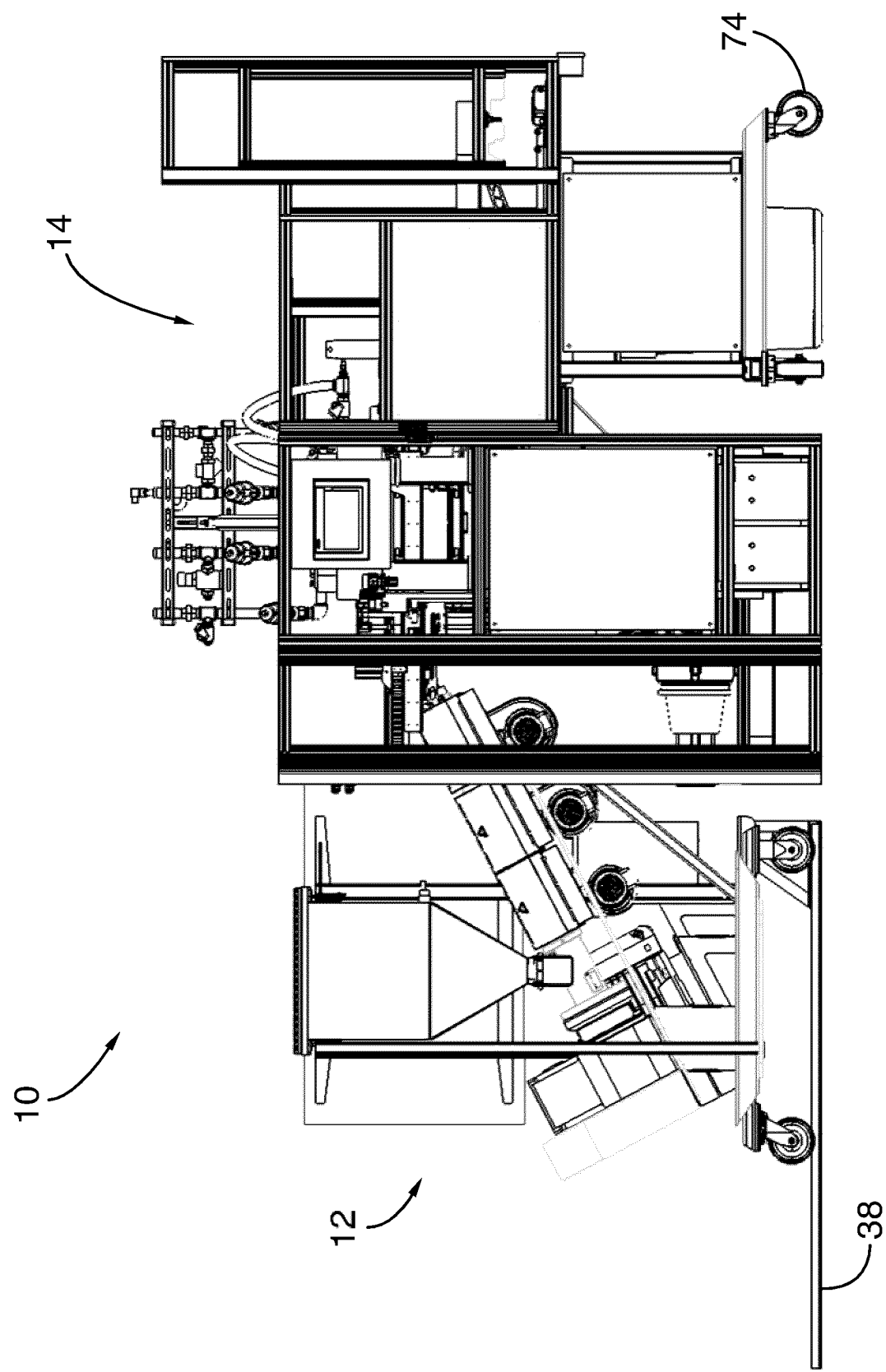
FIG. 2 is a side plan view of the system of FIG. 1.
Figure 3:
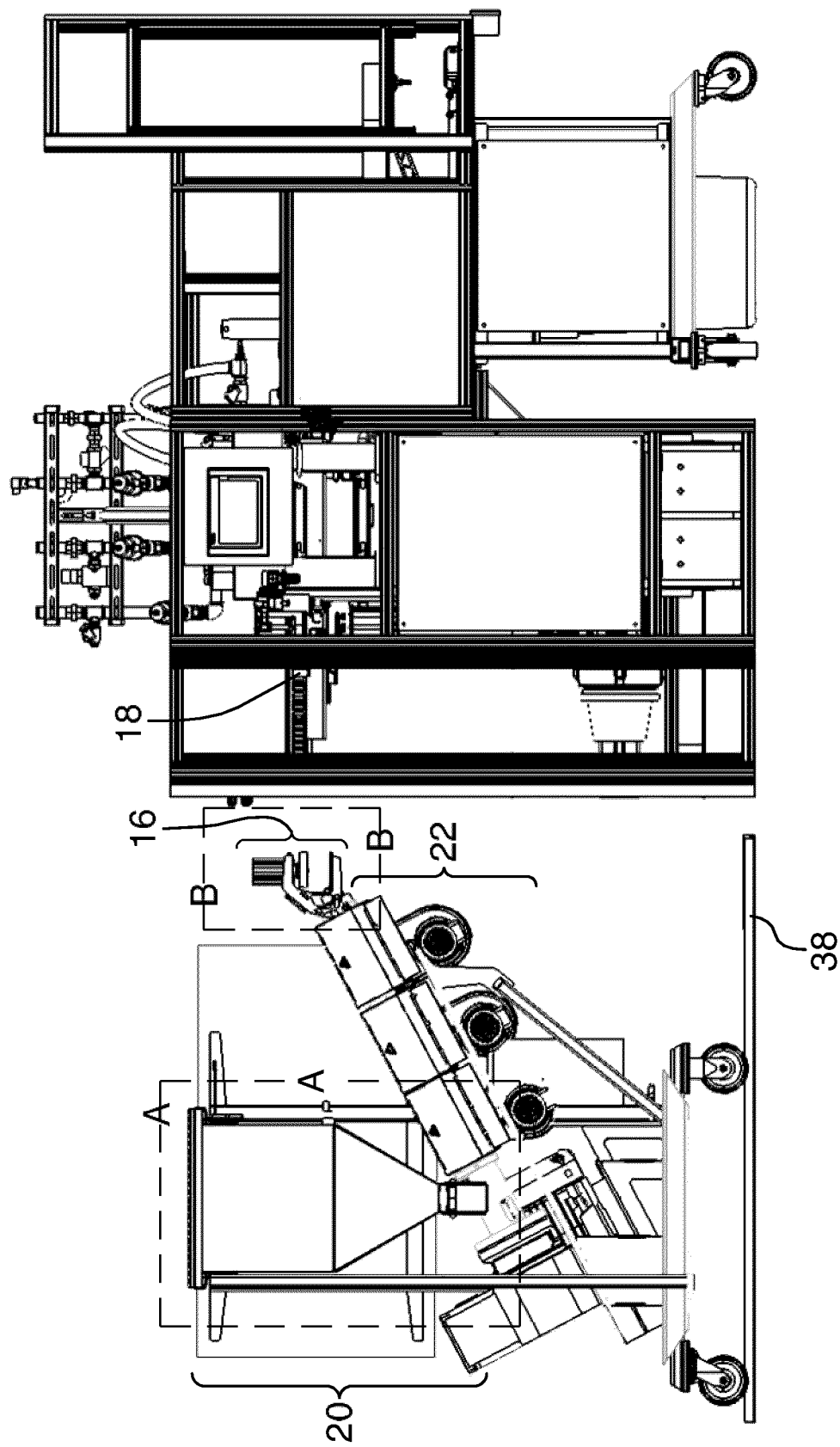
FIG. 3 is a view of the system of FIG. 2 with the puck former in a semi-automatic position.

An exemplary embodiment of the invention 10 is shown in FIGS. 1-3 and, overall, includes a puck former 12 and a record former 14. Puck former 12 has an outlet 16 and is adapted to periodically produce a puck (not shown) from resin pellets (not shown) and deliver the puck to outlet 16. Record former 14 has a puck receiver 18 and is adapted, upon delivery of the puck to puck receiver 18, to automatically produce a record from the puck.

Along with outlet 16, puck former 12 further has a hopper subsystem 20, by which resin pellets are introduced to system 10, and a melting subsystem 22, which melts the resin pellets for extrusion into a puck at outlet 16. Hopper subsystem 20 includes a hopper 24 with a pellet outlet 26 and a release port 28 with a latch 30 pivotally fixed thereto.

Figure 6:
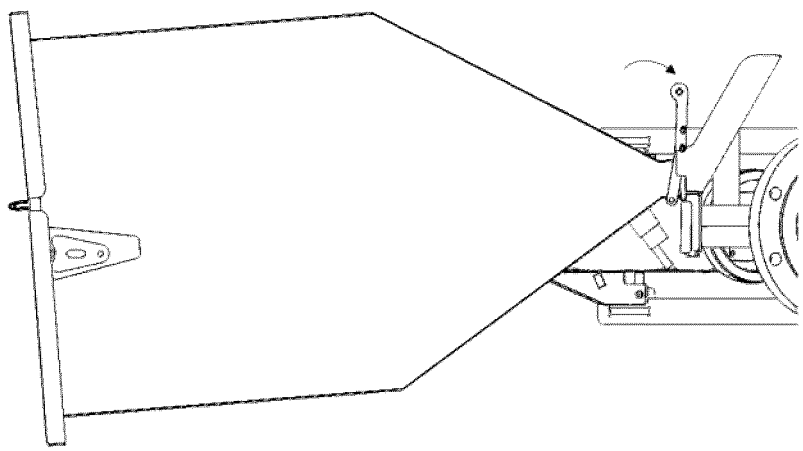
FIG. 6 is a view of the system of FIG. 4 in a latched emptying position.
Figure 5:
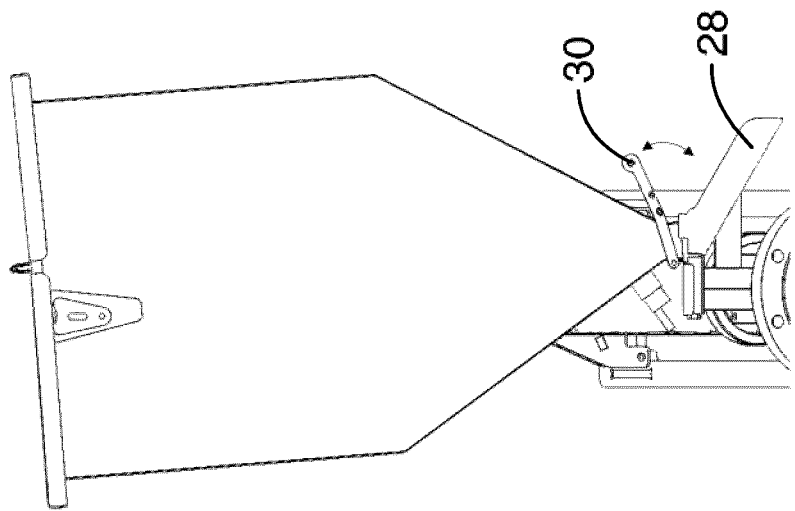
FIG. 5 is a view of the system of FIG. 4 in an unlatched emptying position.
Figure 4:
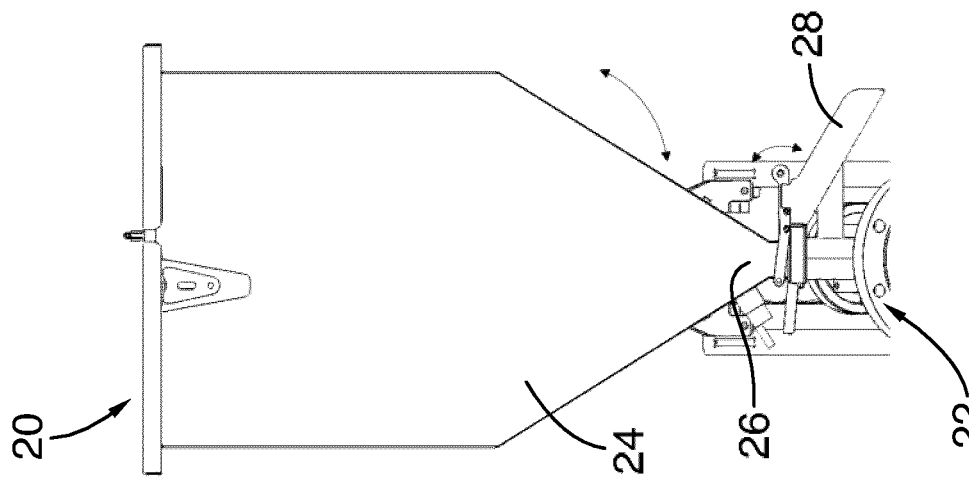
FIG. 4 is an enlarged view of area A of FIG. 3 in a working position with portions removed for clarity.

As seen in FIGS. 4-6, hopper 24 is moveable between a working position (FIG. 4) and an emptying position (FIGS. 5 and 6). In the working position, pellet outlet 26 is in communication with melting subsystem 22 so as to direct the resin pellets into melting subsystem 22 for mixing and melting. In the emptying position, pellet outlet 26 is in communication with release port 28. Release port 28 directs resin pellets from hopper 24 away from system 10 into an external bucket (not shown), thereby allowing hopper 24 to be emptied without the resin pellets being melted. In the depicted embodiment, in order to move hopper 24 between the working and emptying positions, latch 30 is lifted and moved, thereby moving pellet outlet 26, so as to tilt hopper 24 into or out of the emptying position. Latch 30 can then be "locked" in place in order to maintain hopper 24 in the working or emptying position.

Figure 7:
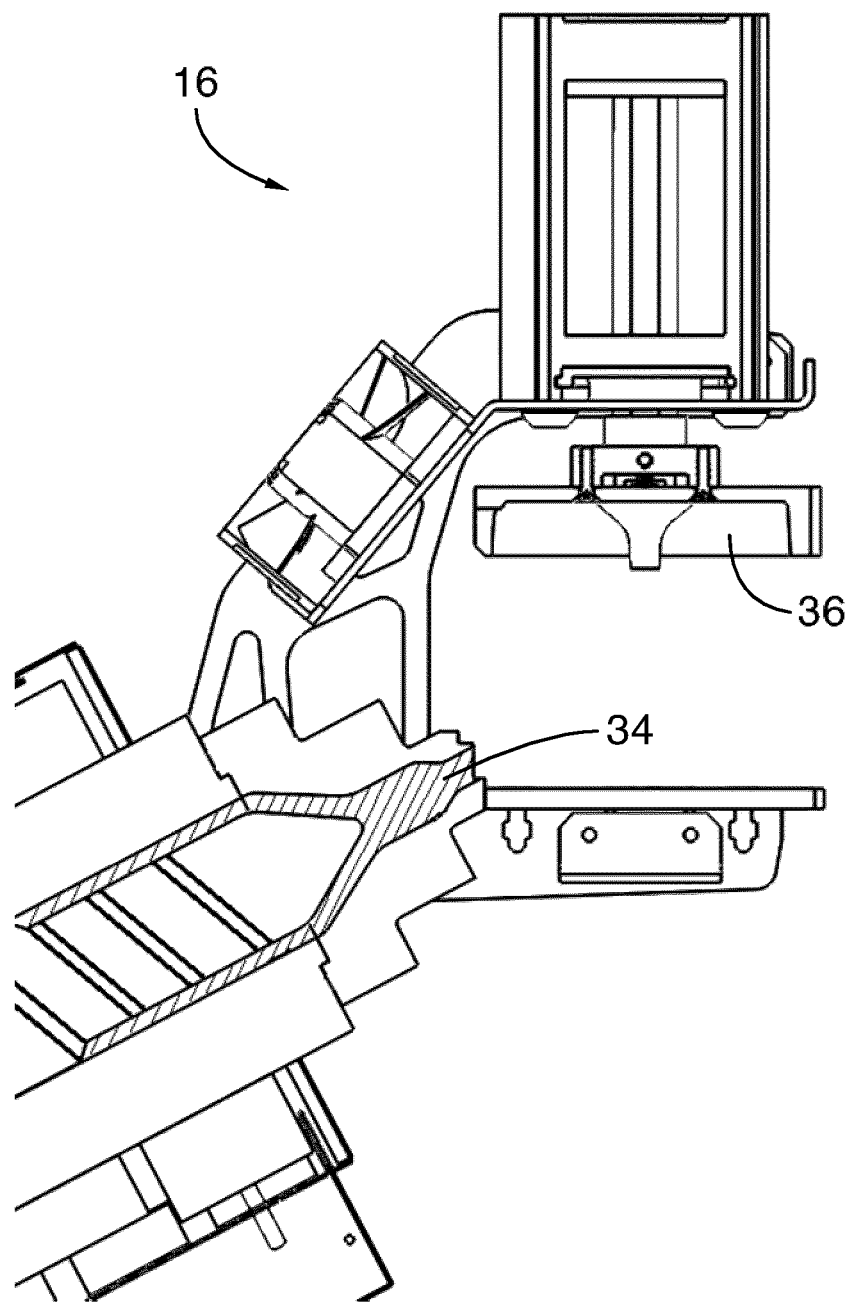
FIG. 7 is an enlarged view of area B of FIG. 3.

When resin pellets are fed into melting subsystem 22, they are directed into a barrel 32. The temperature within and along barrel 32 is controlled so as to melt the resin pellets into molten material. The molten material is then directed to outlet 16. As best seen in FIG. 7, the molten material exits at a nozzle opening 34 to fill a puck-shaped cavity 36, thereby forming a puck. Puck former 12 can be in an automatic or semi-automatic position, which determines whether the puck is then fed directly or indirectly into record former 14.

Puck former 12 is movable between the automatic position (see in FIG. 2) and the semi-automatic position (see FIG. 3) relative to record former 14. When puck former 12 is in the automatic position, outlet 16 of puck former 12 is coterminous with puck receiver 18 of record former 14, so the formed puck can be directly transferred from outlet 16 to puck receiver 18. When puck former 12 is in the semi-automatic position, puck former 12 is spaced apart from record former 14 such that outlet 16 and puck receiver 18 are accessible by an operator (not shown) who can manually transfer the puck from outlet 16 to puck receiver 18.

As shown in FIGS. 2 and 3, system 10 further includes rails 38 upon which puck former 12 is mounted for sliding movement of puck former 12 between the automatic and semi-automatic position and for maintaining relative alignment therebetween.

In this particular embodiment, when in use, puck former 12 automatically forms the vinyl puck when puck former 12 is in the automatic position. When puck former 12 is in the semi-automatic position away from record former 14, puck former 12 forms the vinyl puck on demand by the operator. Once the puck is complete, the operator may then add additional colours or otherwise manipulate the puck prior to feeding the puck into puck receiver 18 of record former 14 to be automatically formed into a record.

Figure 8:
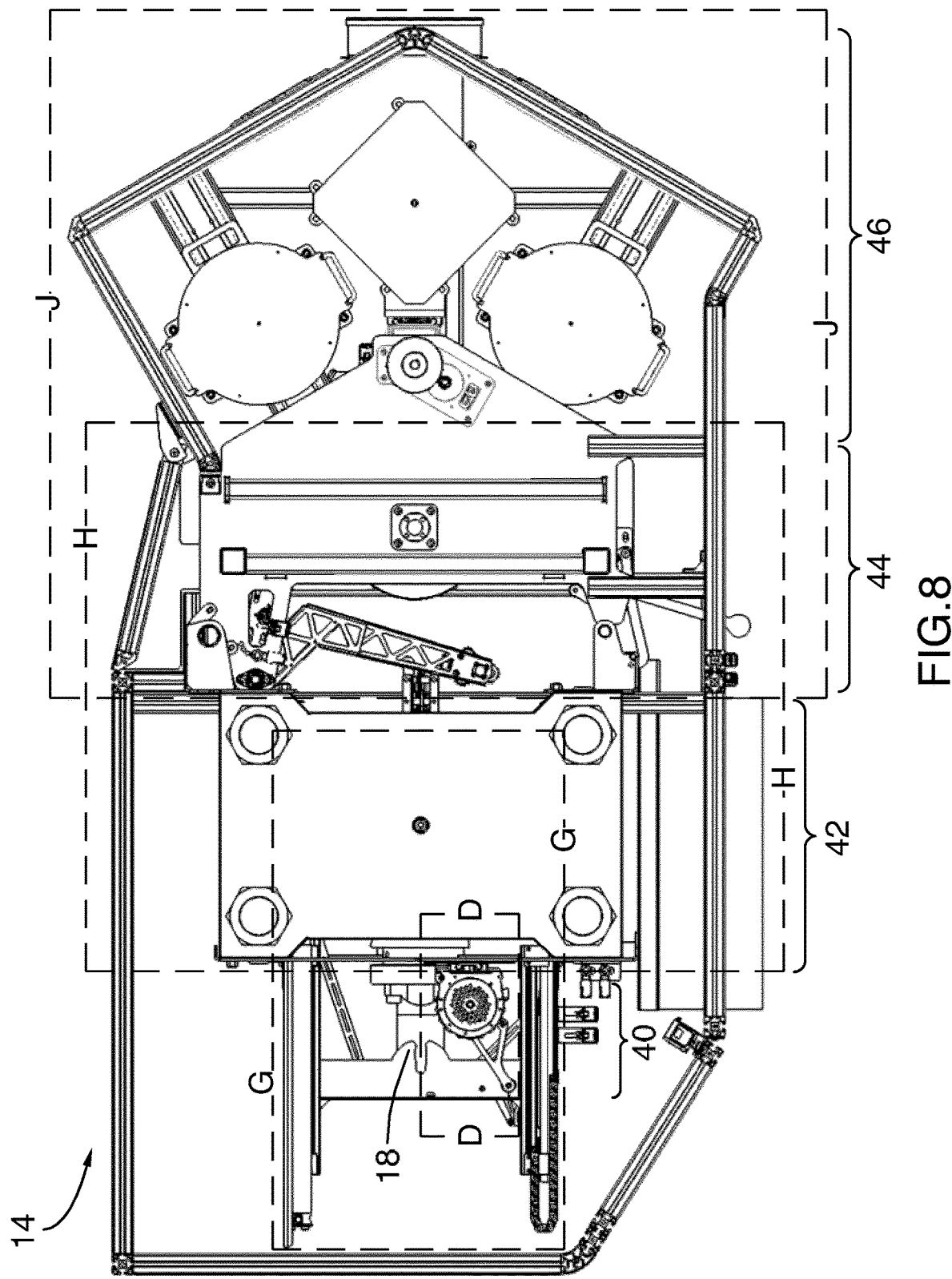
FIG. 8 is an enlarged view of area C of the system of FIG. 1 in an active position with portions removed for clarity.

As best seen in FIG. 8, record former 14 comprises a puck receiver 18 coupled to a labeling subsystem 40, which is coupled to a press subsystem 42, which is coupled to a trimming subsystem 44, and which in turn is coupled to a cooling subsystem 46.

Figure 10:
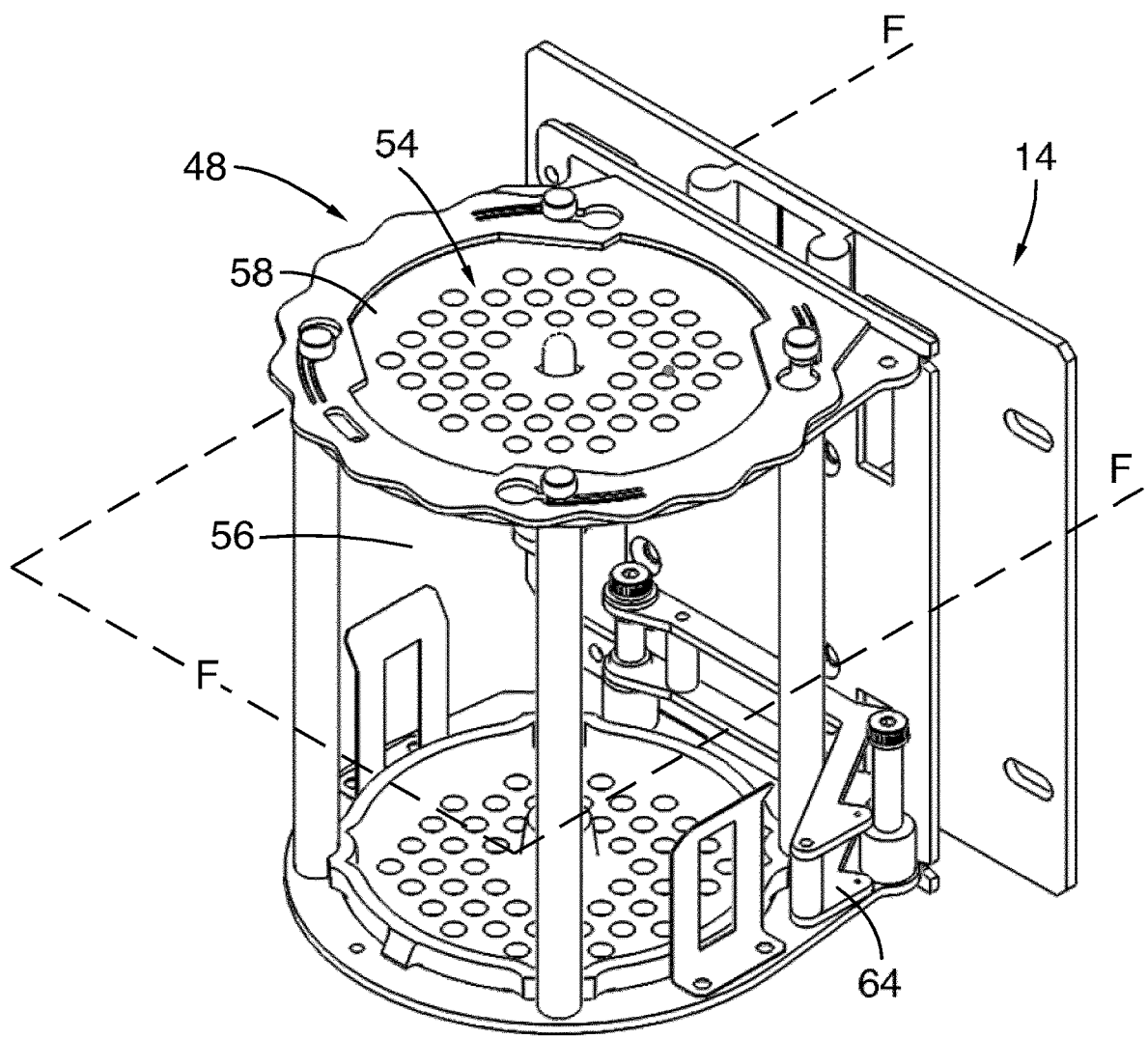
FIG. 10 is an enlarged side perspective view of area E of FIG. 9 with portions removed for clarity.
Figure 11:
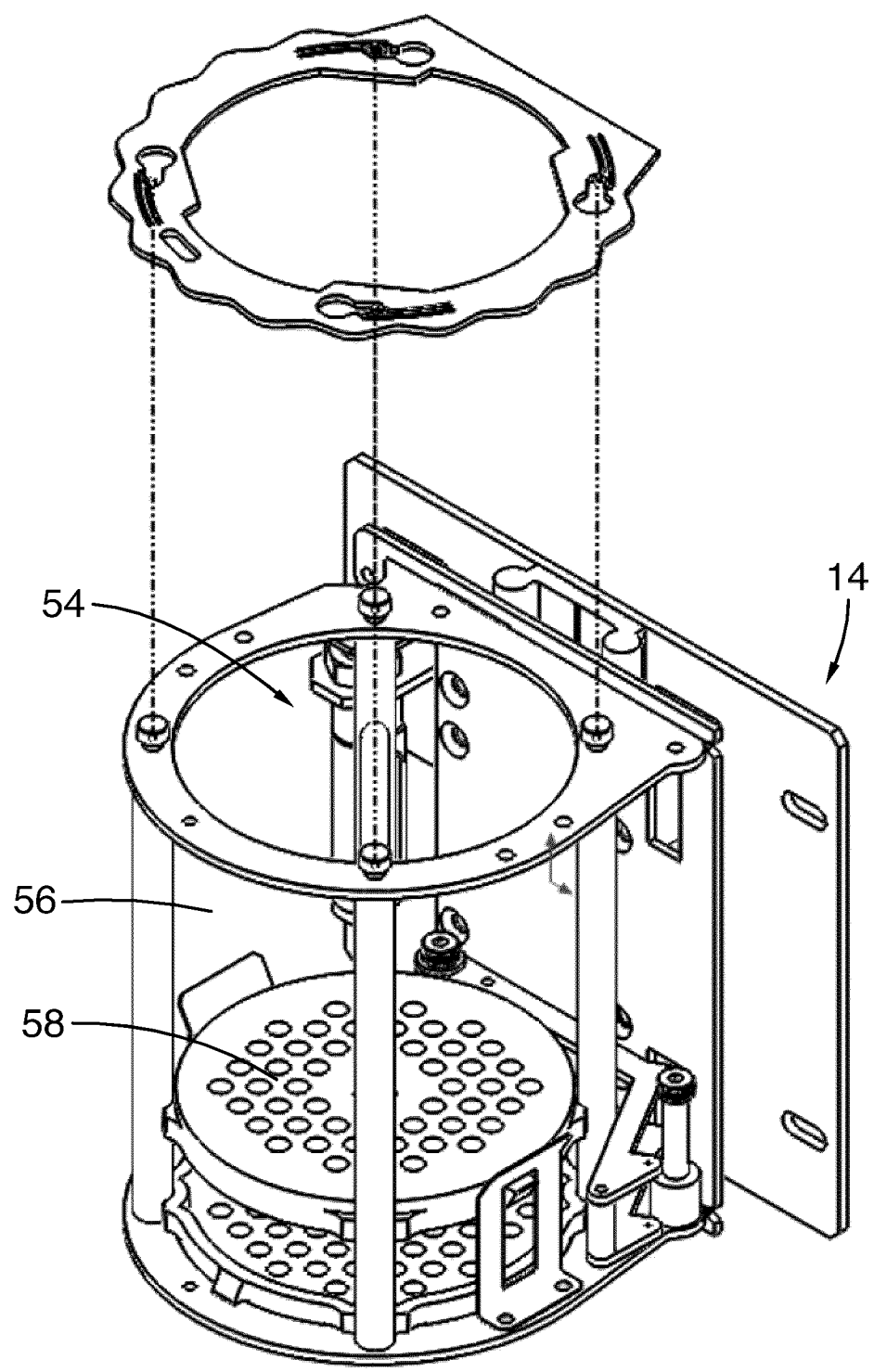
FIG. 11 is a partially exploded view of FIG. 10.

Labeling subsystem 40 (see FIG. 9) comprises two label cartridges 48, two label swing arms 50, and two cartridge quick release mechanisms 52. As seen in FIGS. 10 and 11, label cartridge 48 terminates at an open end 54 and has a cavity 56 adapted to hold a stack of labels (not shown) and a platform 58 within cavity 56. Platform 58 is movable towards open end 54 such that, in use with the stack of labels, platform 58 directs or moves the labels towards open end 54.

Figure 9:
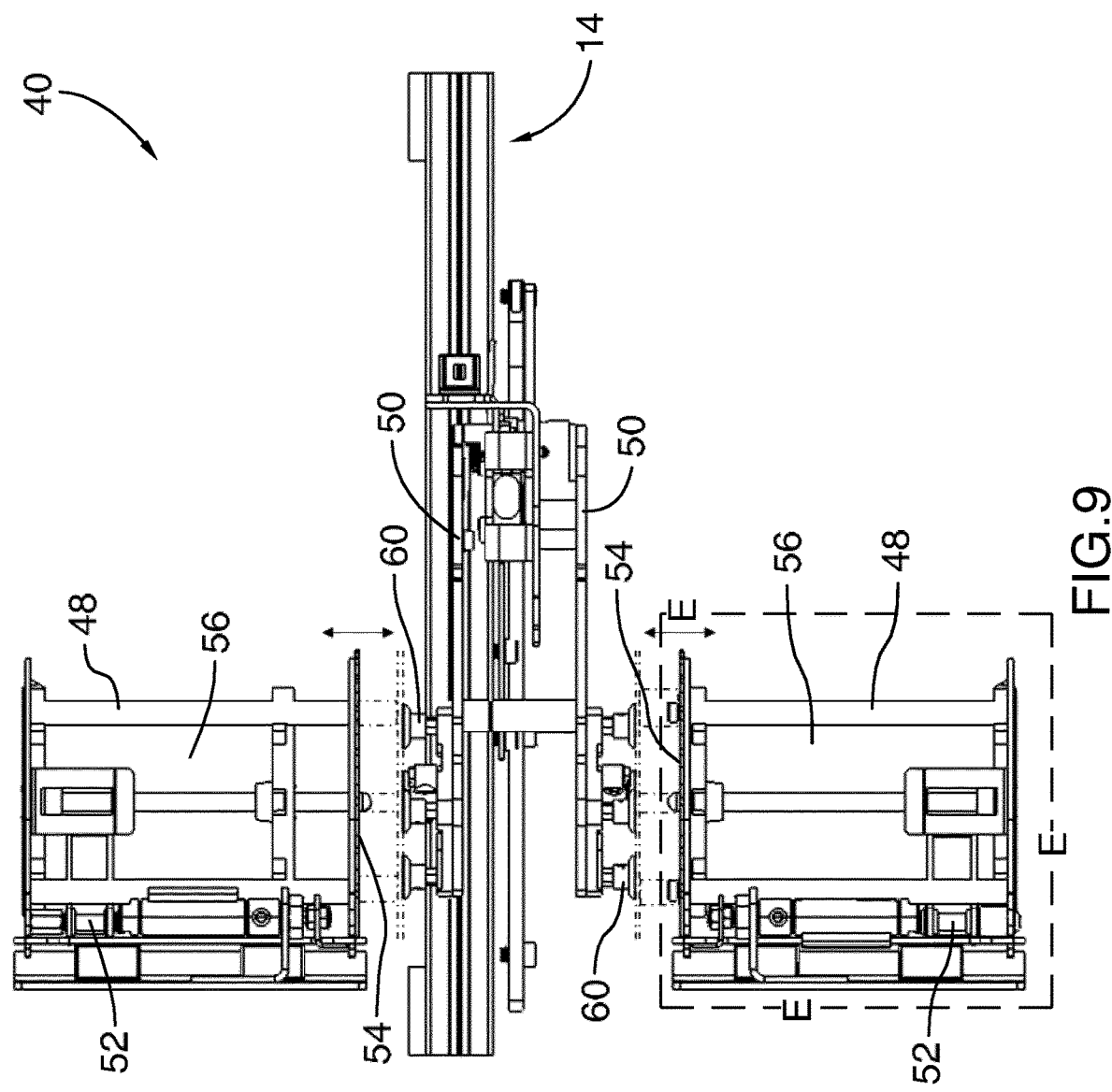
FIG. 9 is an enlarged side plan view of area D of FIG. 8 with portions removed for clarity.

Label swing arm 50, as depicted in FIG. 9, has vacuum suction cups 60 for gripping and transferring a label onto the puck. Each label swing arm 50 is operatively coupled to record former 14 proximate to one of label cartridges 48 so vacuum suction cups 60 are directed towards open end 54 of label cartridge 48 to enable label pick up by vacuum suction cups 60.

Figure 12:
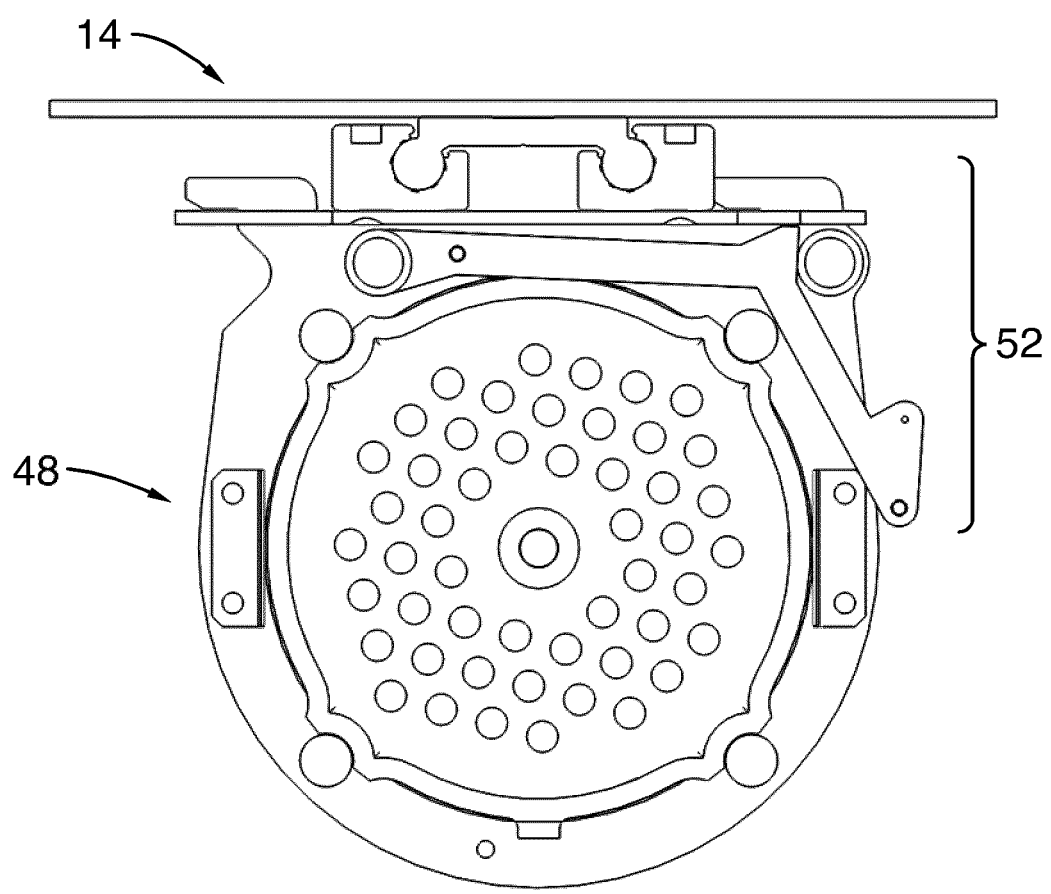
FIG. 12 is an enlarged sectional view of FIG. 10 along plane F in a latched configuration.
Figure 13:
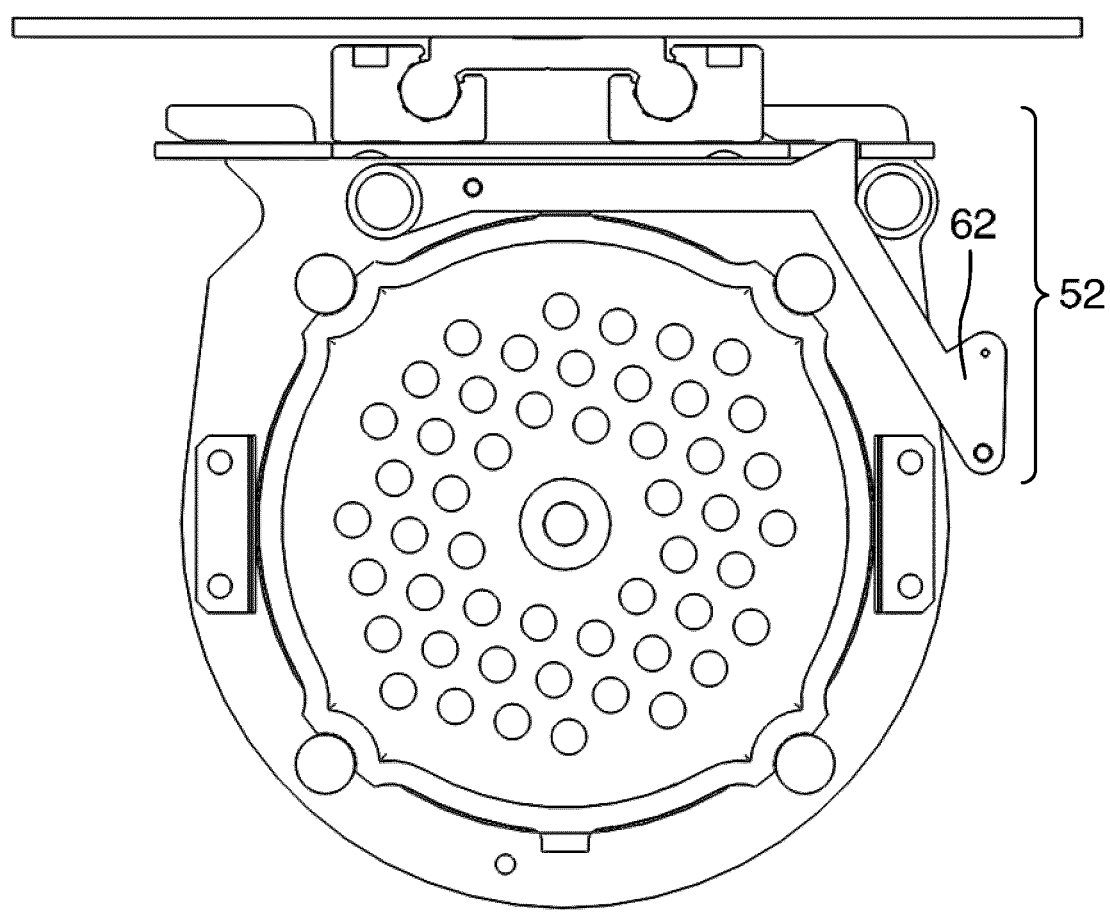
FIG. 13 is a view of FIG. 12 in an unlatched configuration.

As seen in FIGS. 12 and 13, record former 14 and label cartridge 48 each have interengageable components which collectively define a cartridge quick release mechanism 52. Cartridge quick release mechanism 52 releasably couples label cartridge 48 to record former 14 so that the operator can remove or replace label cartridge 48 from record former 14 without tools. In the depicted embodiment, cartridge quick release mechanism 52 includes a thumb-actuated cartridge latch 62 which locks label cartridge 48 onto record former 14. FIG. 12 shows label cartridge 48 latched to record former 14 and FIG. 13 shows label cartridge 48 unlatched.

Figure 14:
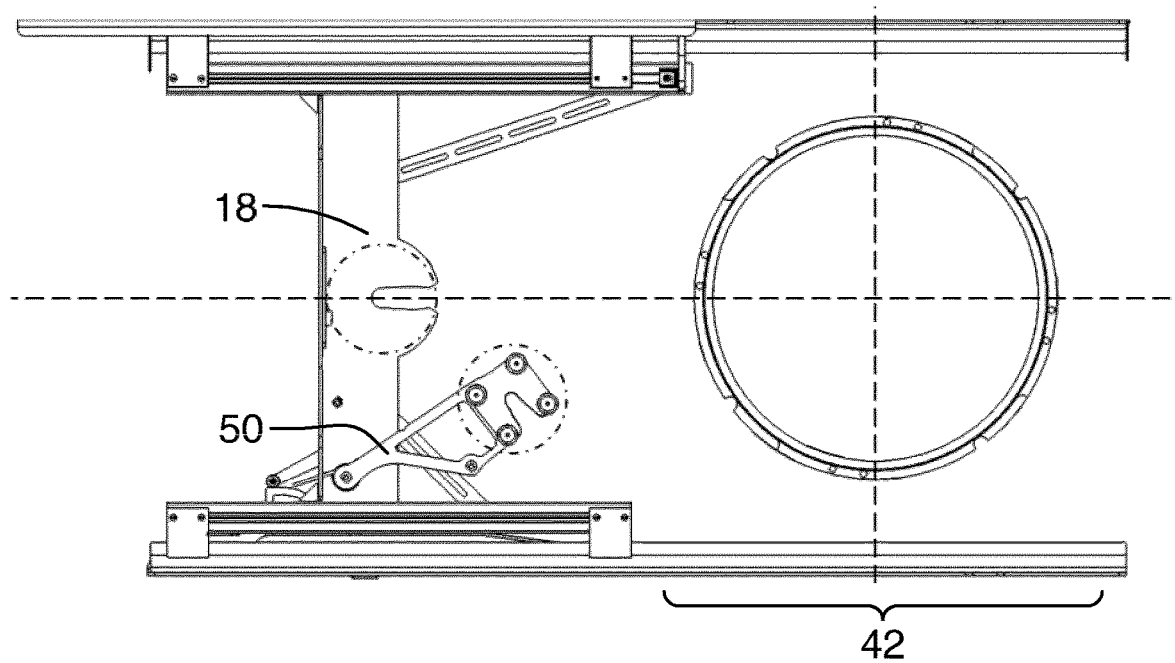
FIG. 14 is an enlarged view of area G of FIG. 8 with portions removed for clarity.
Figure 15:
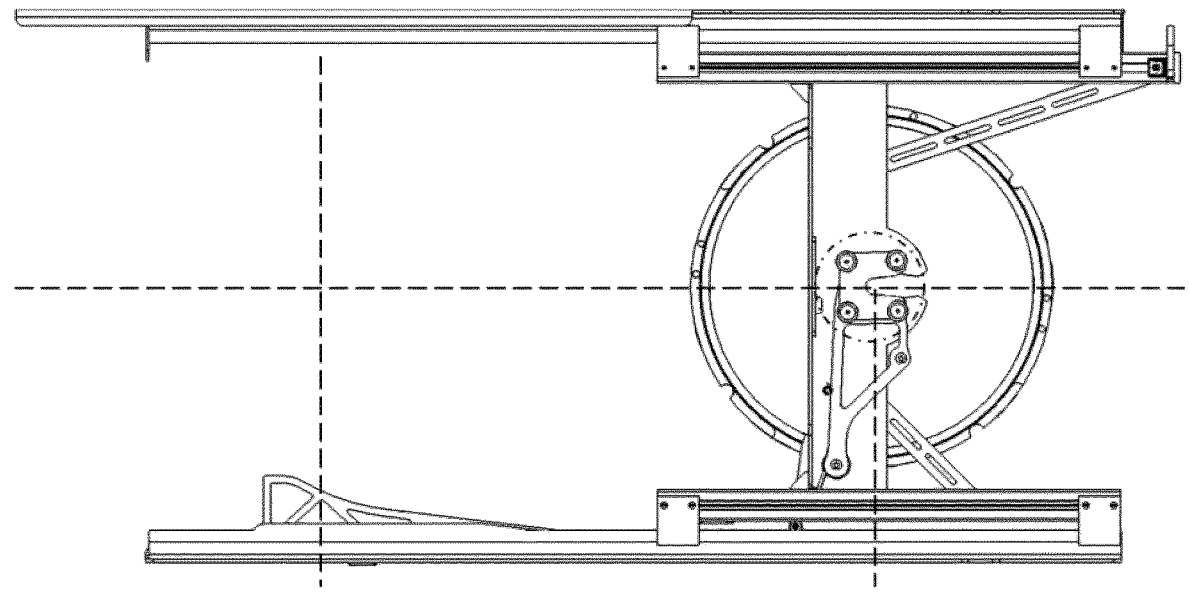
FIG. 15 is a view of FIG. 14 in a subsequent configuration.

In use, as shown in FIG. 9, two label cartridges 48 are coupled to record former 14 and each is paired with one label swing arm 50. Each label cartridge 48 is mounted so that each open end 54 is directed towards its corresponding suction cups 60 of label swing arm 50. In this way, an upper label and a lower label (not shown) can be applied to either side of the puck (shown in dotted lines) as seen in FIGS. 14 and 15. As the puck is shuttled towards press subsystem 42, the label (shown in dotted lines) is picked up by label swing arms 50 and centered on the puck.

Figure 16:
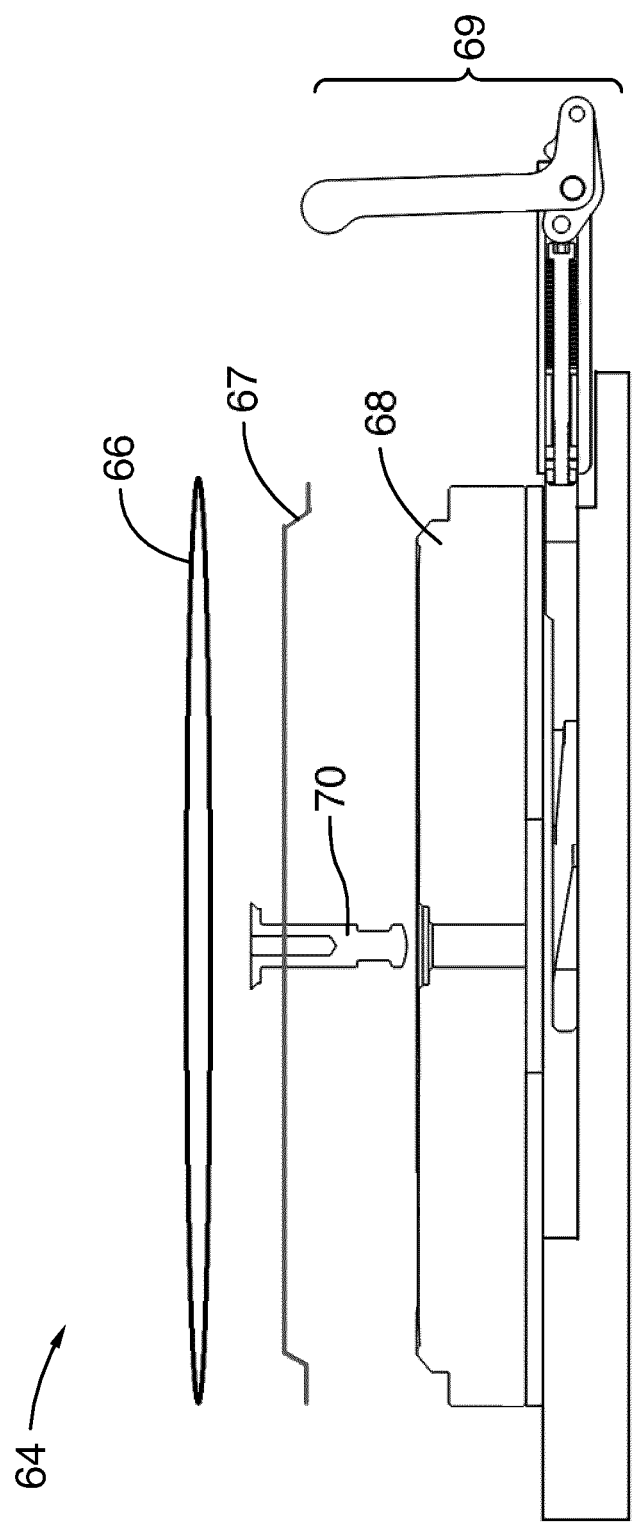
FIG. 16 is an exploded side plan view of a mould.

As depicted in FIG. 16, a mould 64 in press subsystem 42 comprises a clamp ring 66, a stamper 67 with grooves, a platen 68, and a locking mechanism 69. The label-puck-label stack is then shuttled between stamper 67 and platen 68. Moulds 64 are heated, then pressed together to squeeze the puck into a record, then cooled to facilitate release from the mould.

Figure 17:
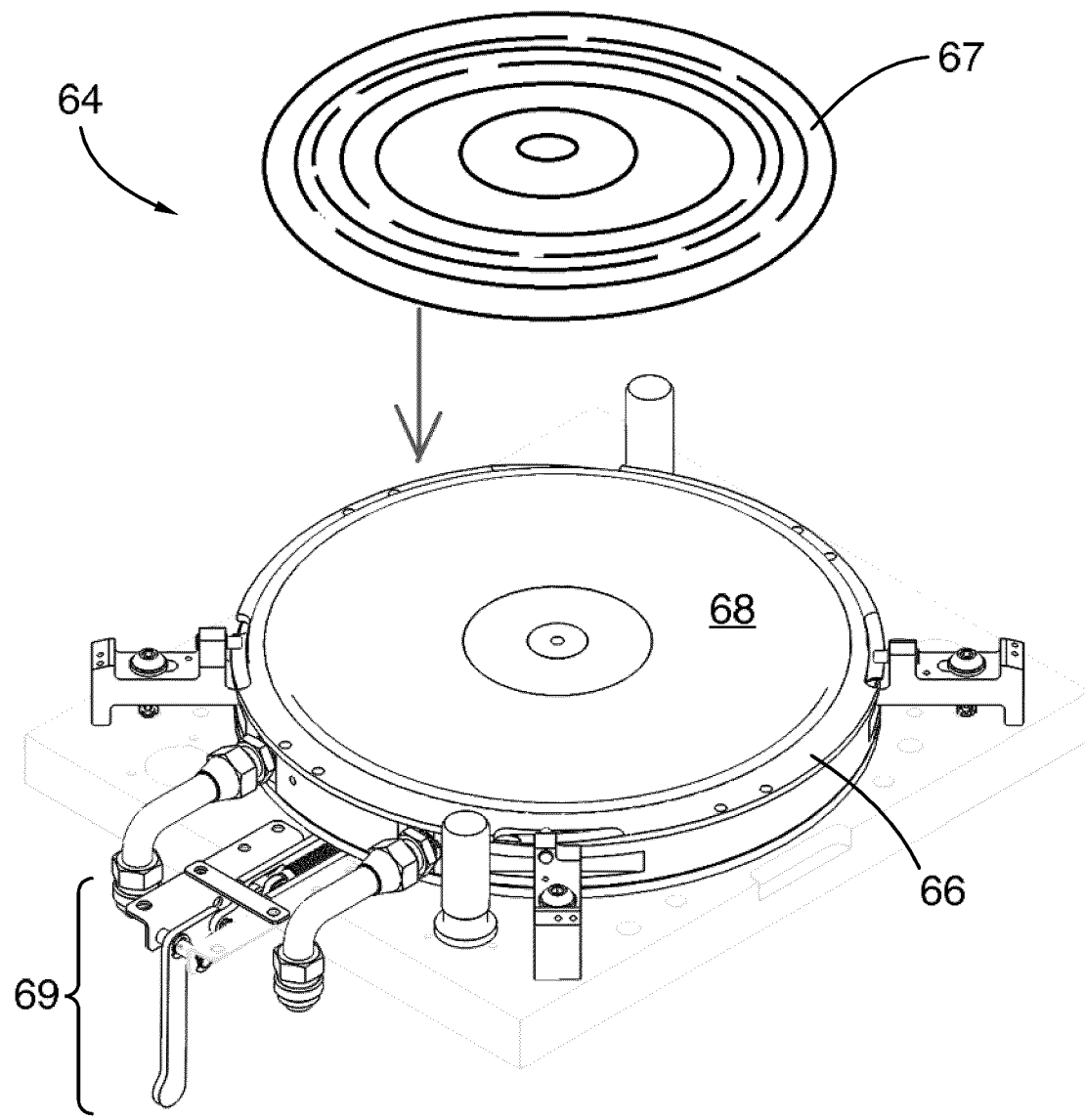
FIG. 17 is a partial exploded top perspective view of the mould of FIG. 16.

Stamper 67 is releasably coupled to record former 14 without tools by mould locking components which collectively define a combination quick release mechanism. In the depicted embodiment seen in FIGS. 16-17, the combination quick release mechanism comprises clamp ring 66 and locking mechanism 69.

Figure 18B:
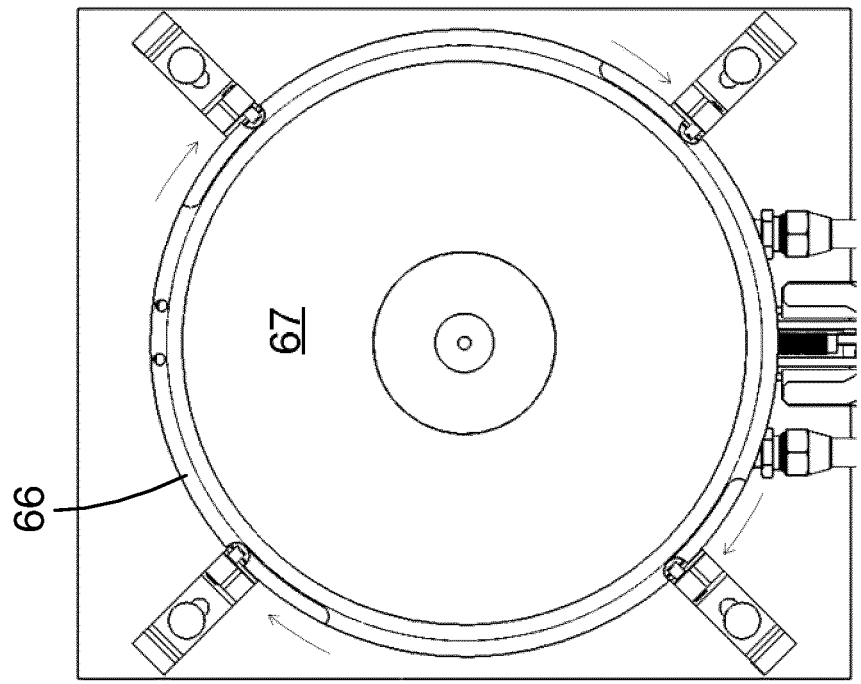
FIG. 18B is a view of the mould of FIG. 18A with the clamp ring in an unlocked position.
Figure 18A:
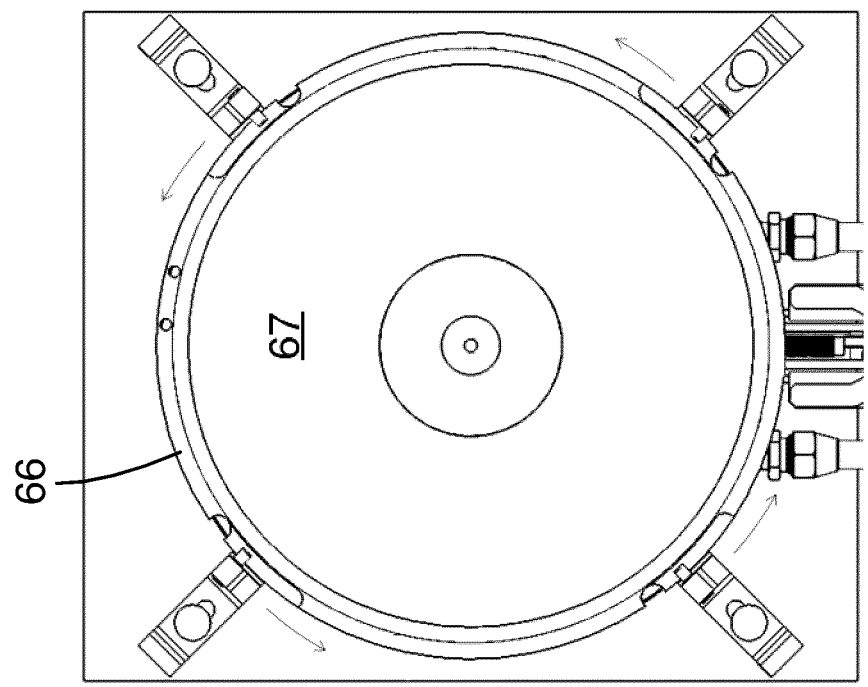
FIG. 18A is a top plan view of the mould of FIG. 17 with a clamp ring in a locked position.

Clamp ring 66 holds stamper 67 in place via a friction fit. As seen in FIGS. 18A and 18B, the friction fit is loosened when the operator twists clamp ring 66 counterclockwise to rotate from a locked to an unlocked position. Reversely, the operator can tighten clamp ring 66 by twisting clamp ring 66 in a clockwise direction.

Figure 19:
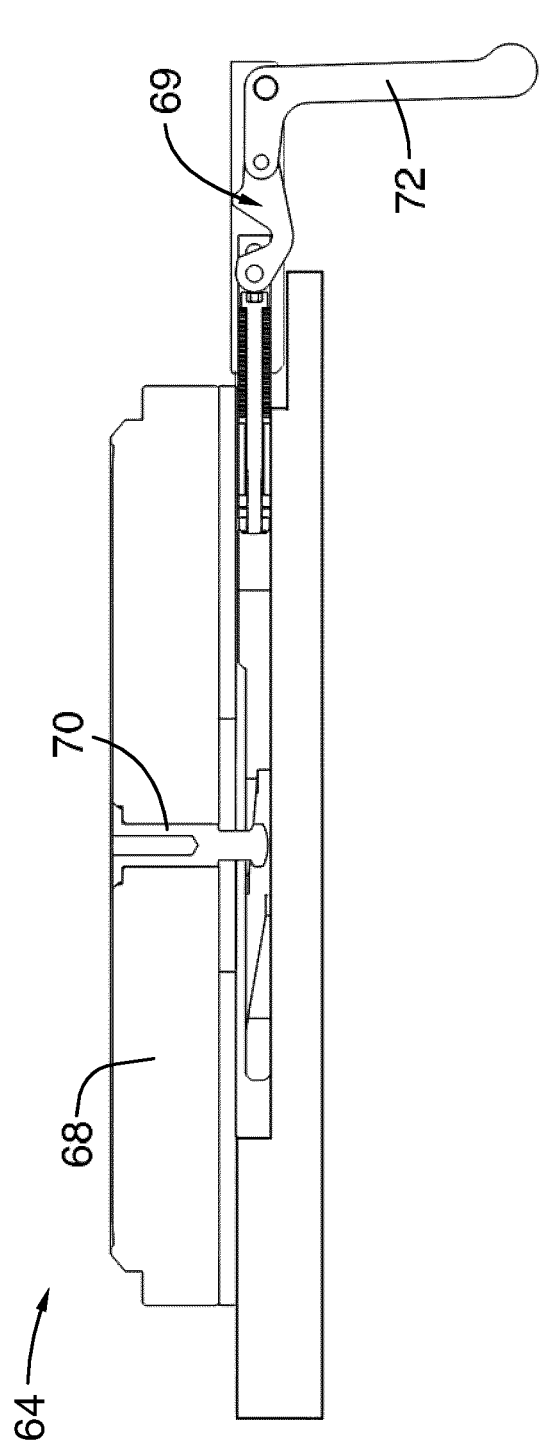
FIG. 19 is a side plan view of the mould of FIG. 16 in a locked configuration.
Figure 20:
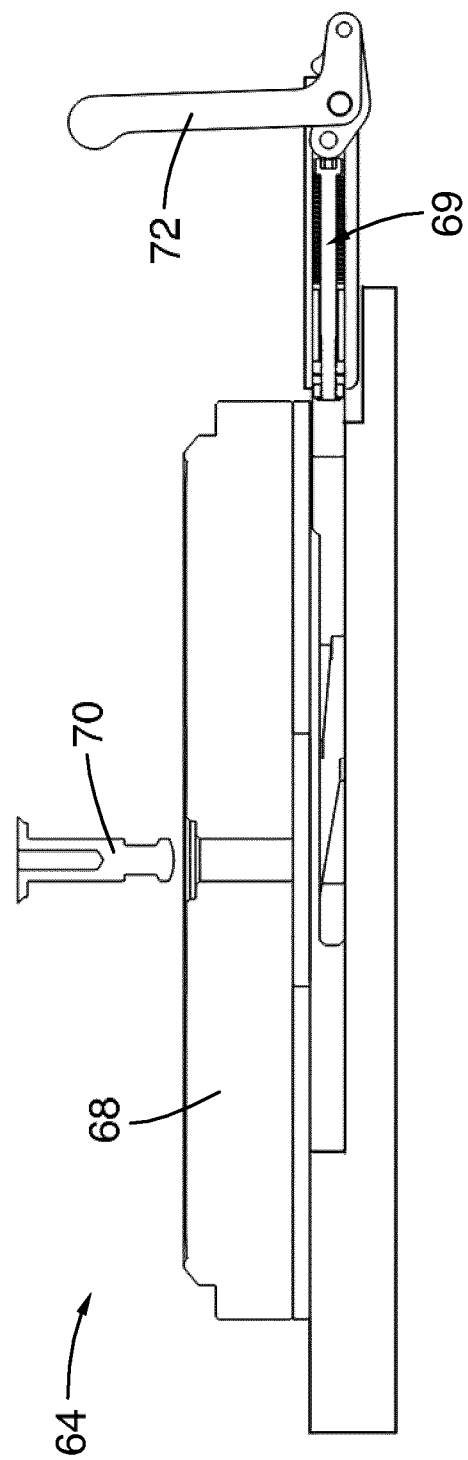
FIG. 20 is a view of FIG. 19 in an unlocked configuration.

Locking mechanism 69 comprises a centre bushing 70 and a lever 72. As seen in FIGS. 19-20, after clamp ring 66 is removed, centre bushing 70 is released when the operator pivots lever 72. After centre bushing 70 is removed, stamper 67 (not shown) and/or platen 68 can be cleaned or removed from record former 14. In this way, the operator can clean or replace stamper 67 and/or platen 68 without tools.

Trimming subsystem 44 is mounted on wheels 74 and pivotably connected to the press subsystem 42. Trimming subsystem 44 is pivotable between an active position, when trimming subsystem 44 is operatively coupled to press subsystem 42 (see FIG. 8), and a mould-change position, when trimming subsystem 44 is spaced apart from press subsystem 42 to permit the operator access to moulds 64 without tools (see FIG. 21).

Figure 22:
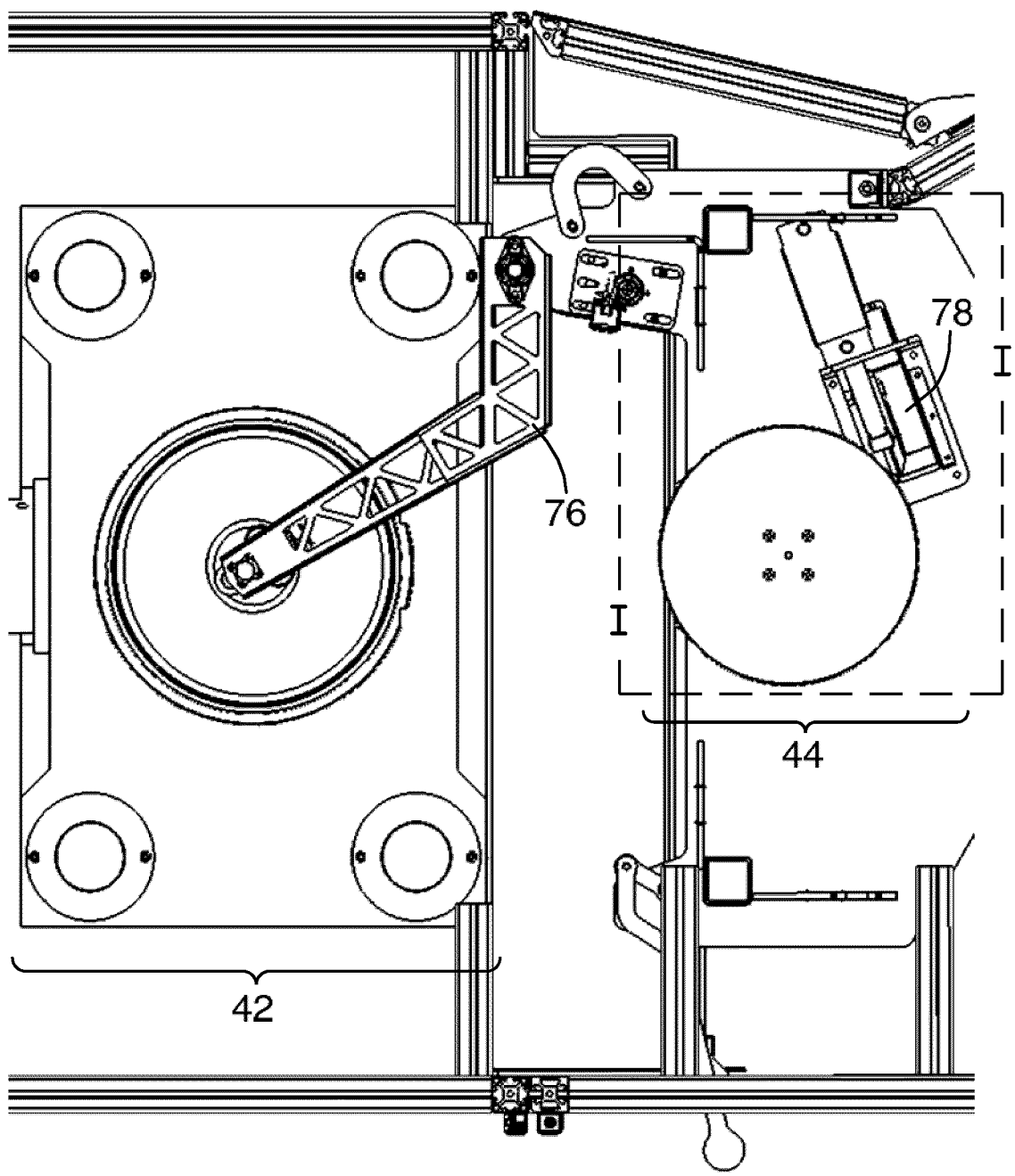
FIG. 22 is an enlarged view of area H of FIG. 8 in a configuration with portions removed for clarity.
Figure 23:
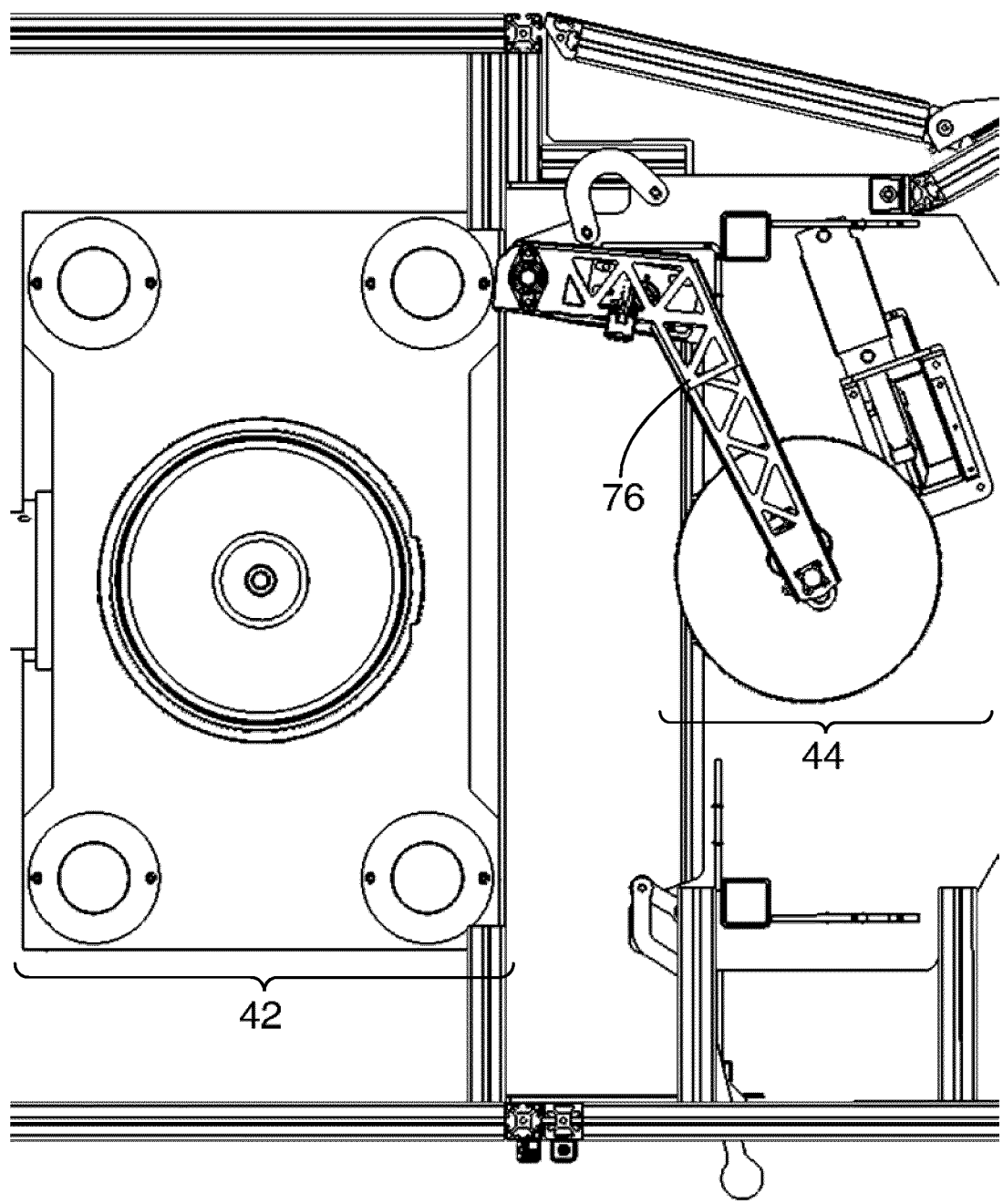
FIG. 23 is a view of FIG. 22 in another configuration.
Figure 25:
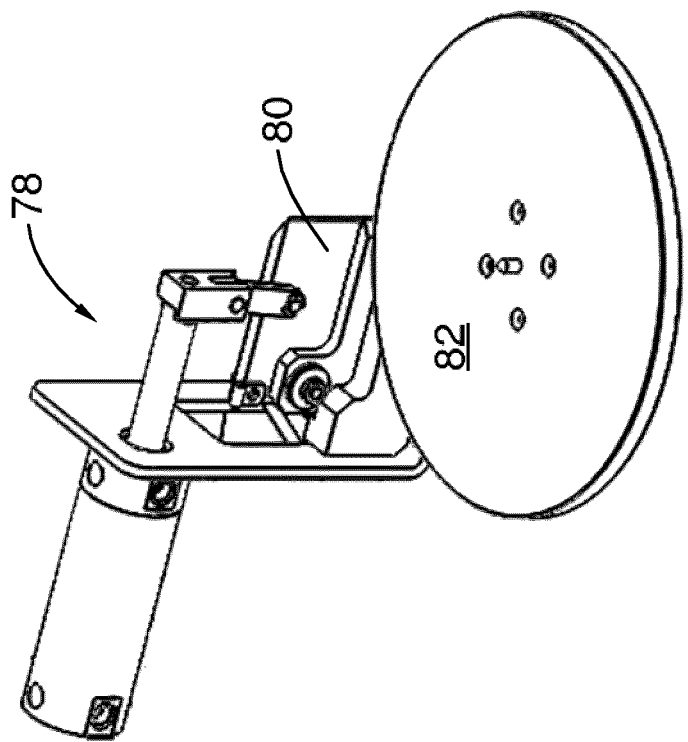
FIG. 25 is a view of FIG. 24 with the blade in a cutting position.
Figure 24:
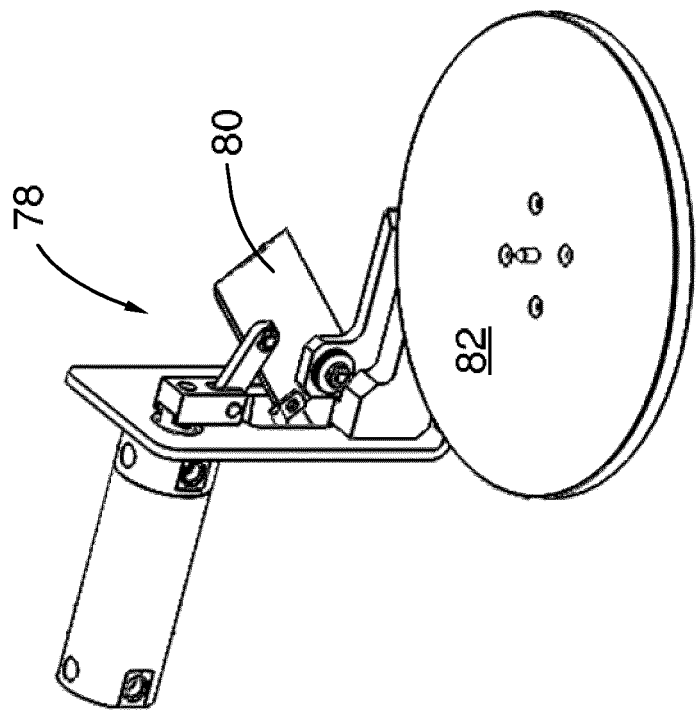
FIG. 24 is an enlarged perspective view of area I of the system of FIG. 22 with a blade in a retracted position.

In the active position, after the puck is pressed into a record in press subsystem 42, a transport swing arm 76 picks up the record and transports it onto a trimmer 78 in trimming subsystem 44 (see FIGS. 22 and 23). As seen in FIG. 24, trimmer 78 includes a retractable blade 80 and a rotating platform 82. Transport swing arm 76 releases the record onto rotating platform 82. As the record rotates with rotating platform 82, blade 80 is actuated into a cutting position (see FIG. 25) tangential to the circular edge of rotating platform 82. In this way, excess material, or "flash" (not shown), is trimmed from the record's edge, forming a finished record (not shown).

Figure 26:
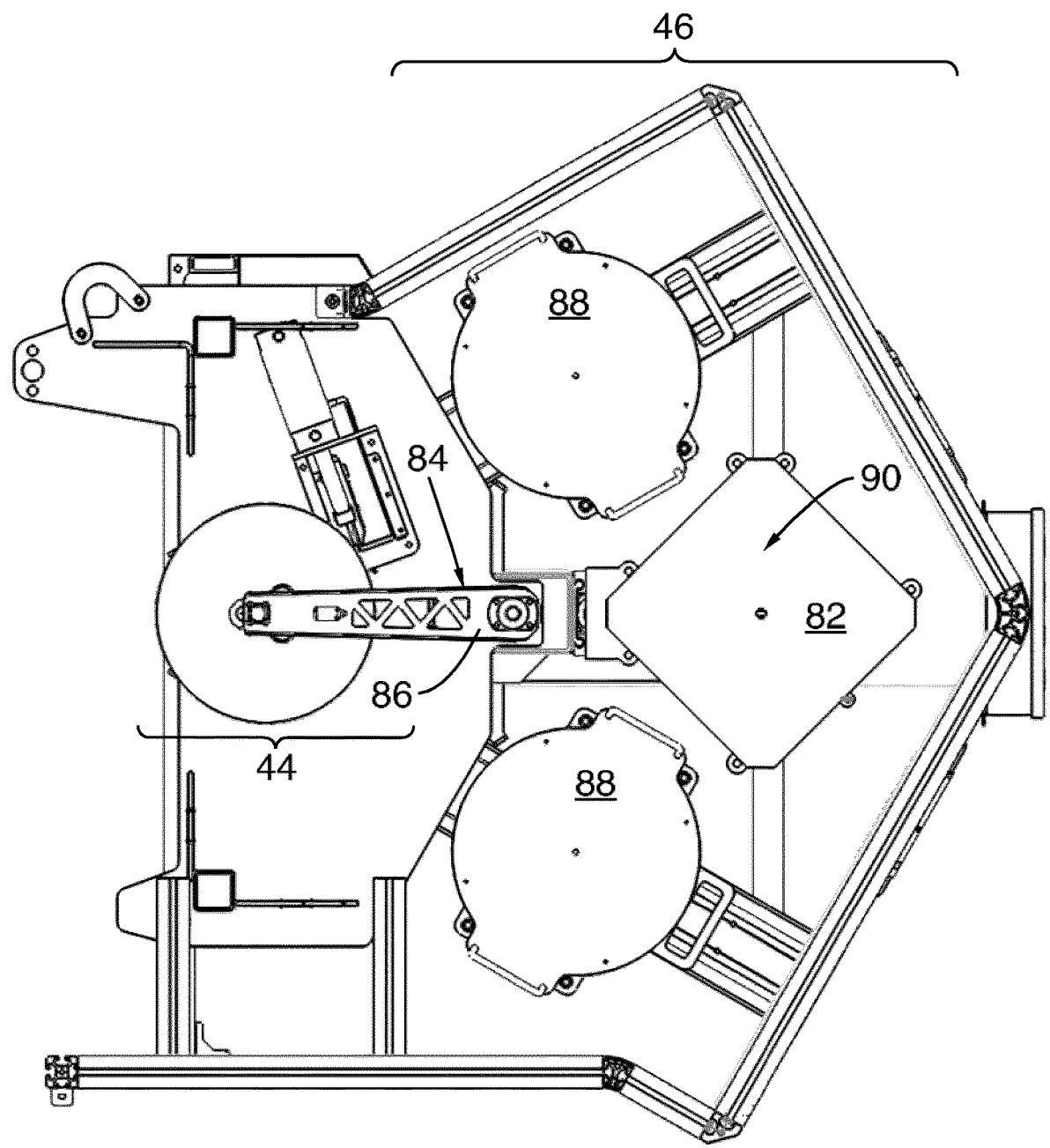
FIG. 26 is an enlarged view of area J of FIG. 8 in a configuration with portions removed for clarity.
Figure 27:
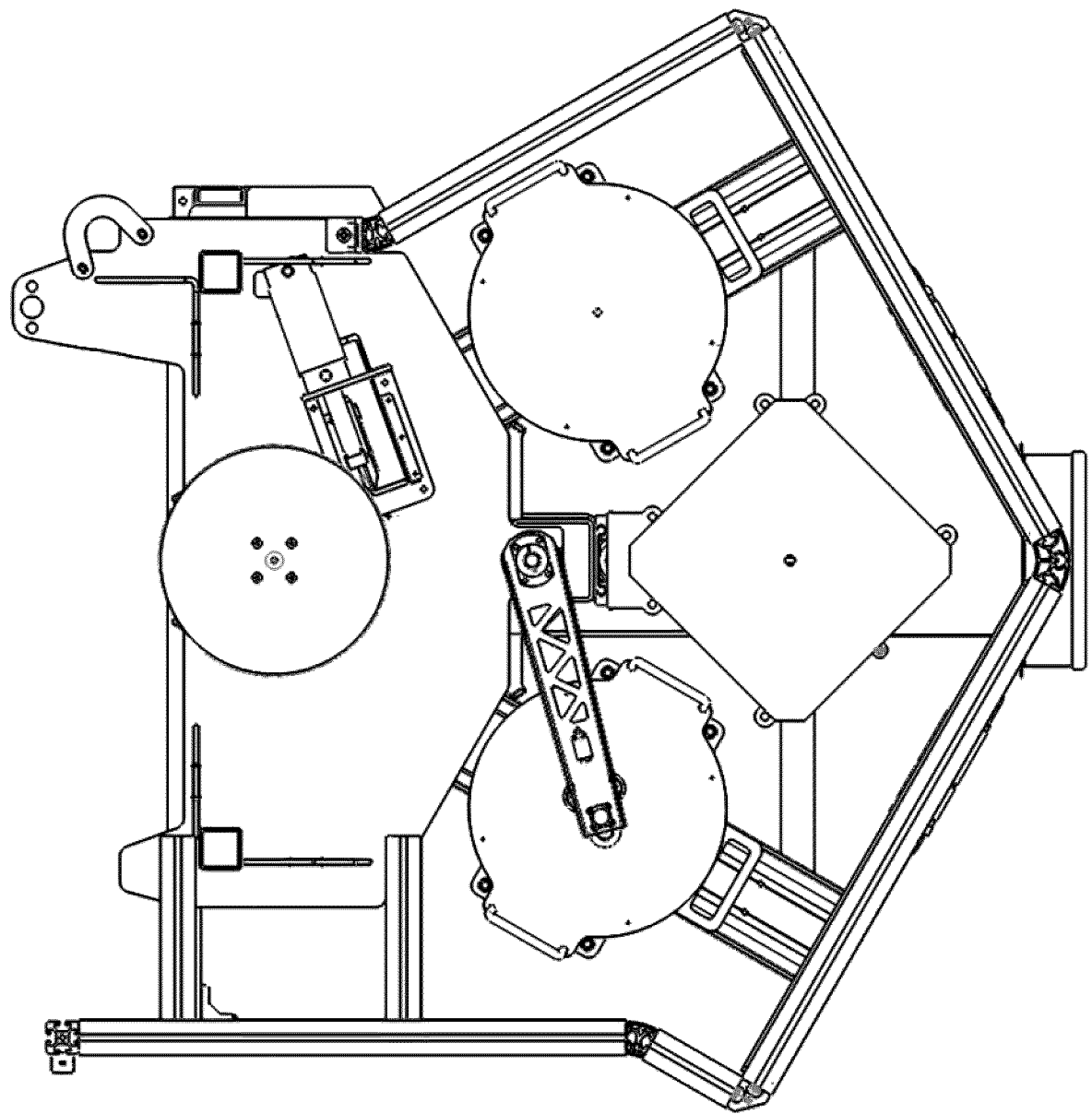
FIG. 27 is a view of FIG. 26 in another configuration.
Figure 28:
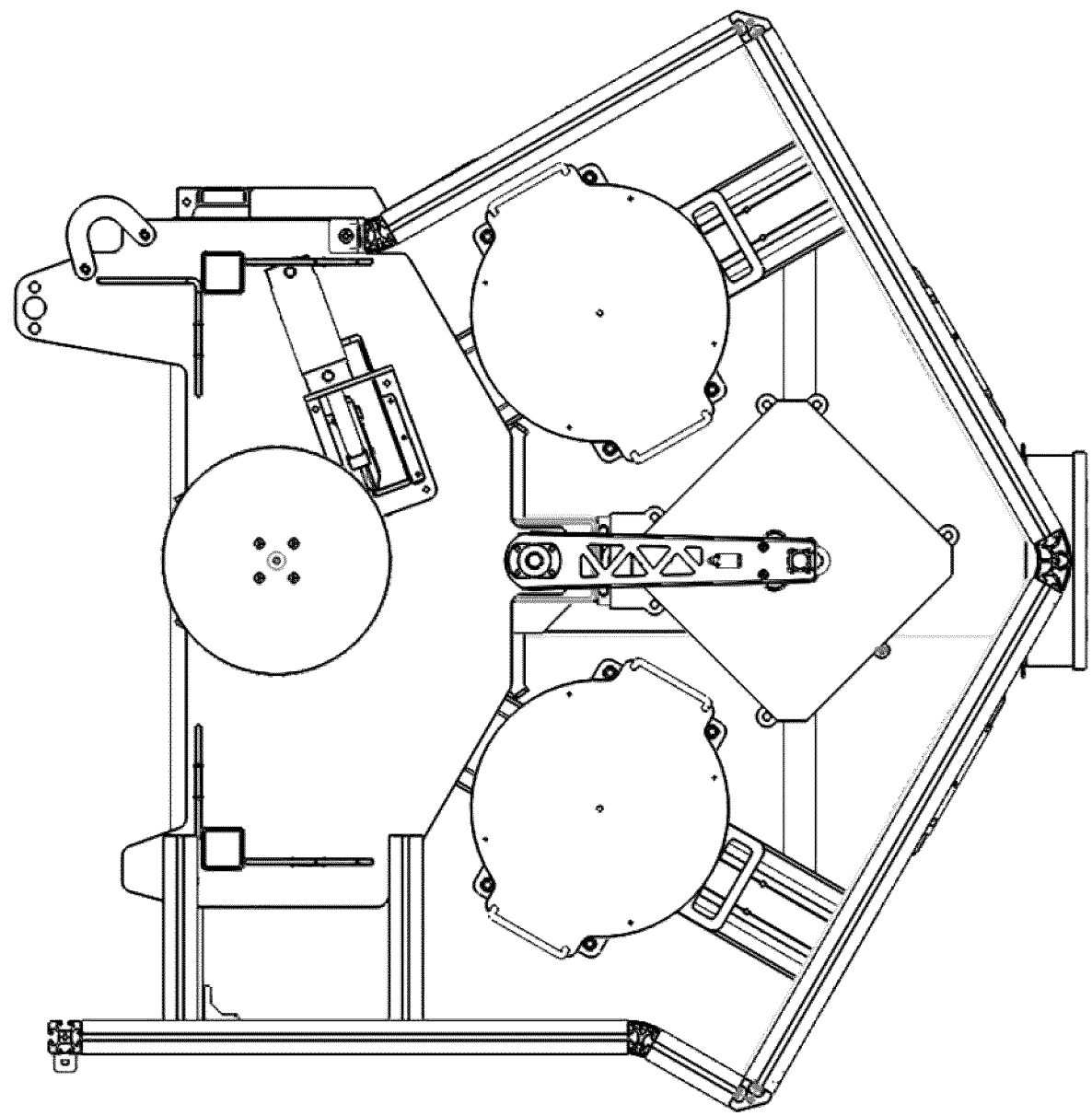
FIG. 28 is a view of FIG. 26 in yet another configuration.
Figure 29:
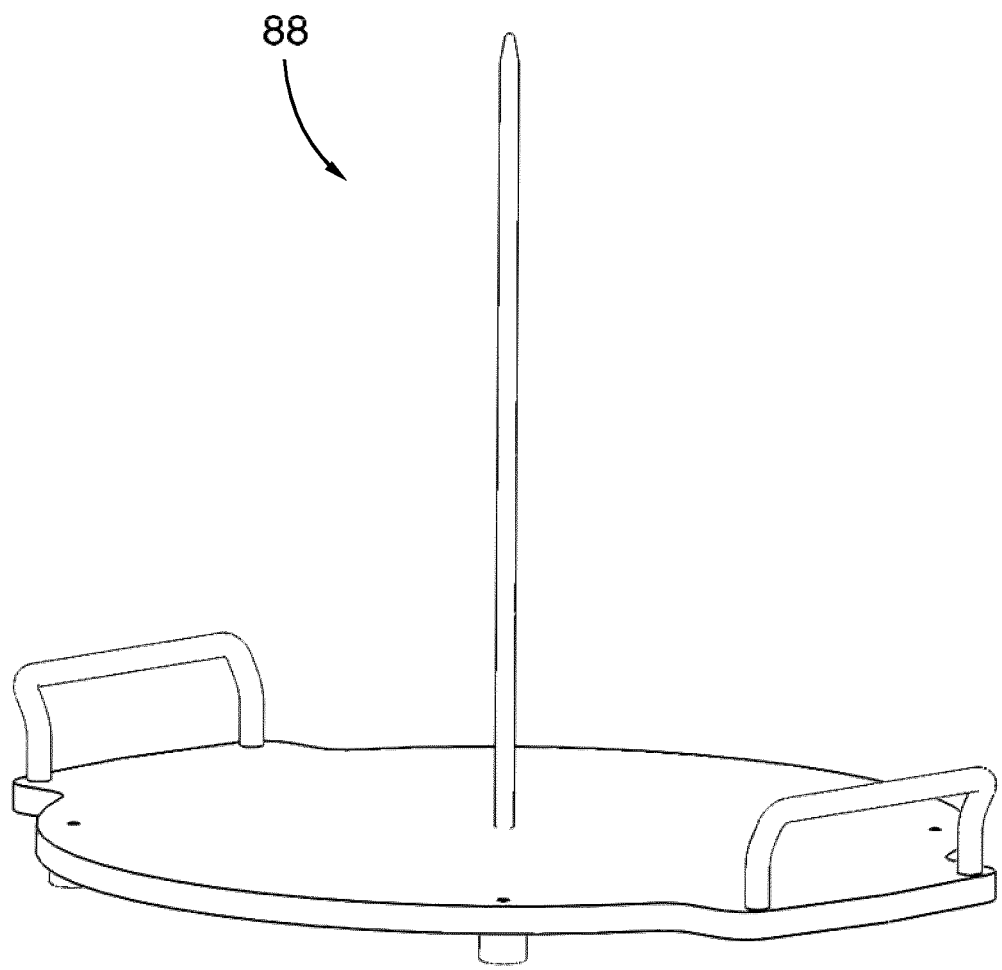
FIG. 29 is a perspective view of a collection spindle.
Figure 30:
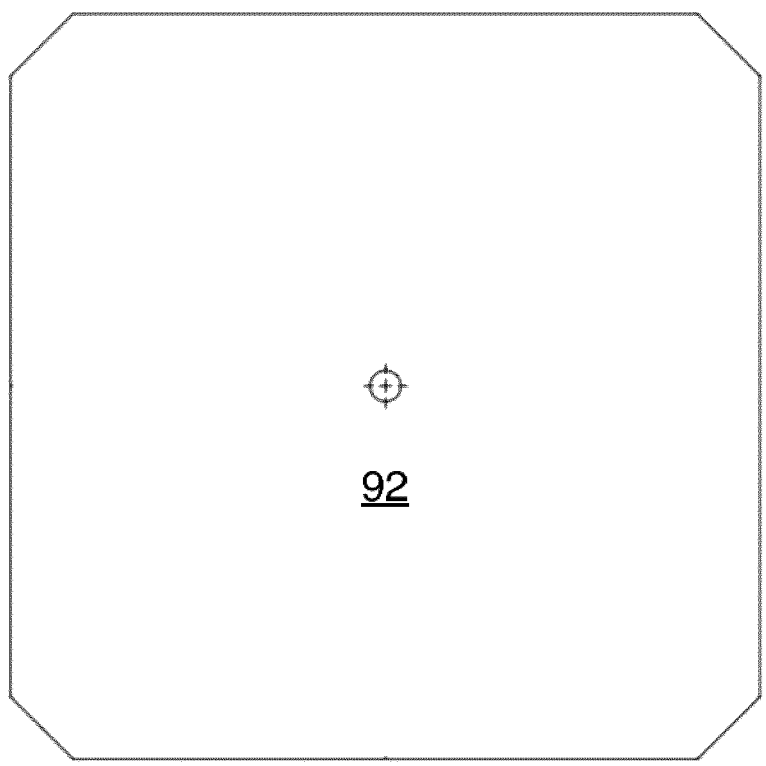
FIG. 30 is a top plan view of a cooling plate.
Figure 31:
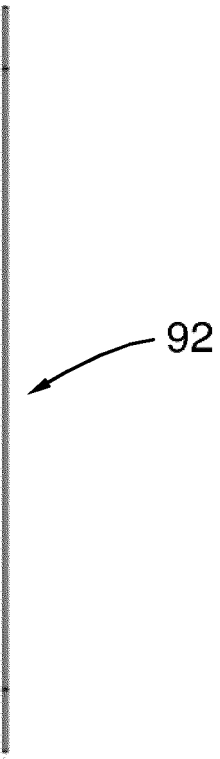
FIG. 31 is a side plan view of the cooling plate of FIG. 31.

After the record is trimmed, the finished record is transported into cooling subsystem 46 via a stacking mechanism. As depicted in FIGS. 26-28, the stacking mechanism is a collection swing arm 86 having a vacuum suction component (not shown) for gripping and releasing the finished records. Cooling subsystem 46 further includes two collection spindles 88 (see FIG. 29) and a cooling plate stack 90 comprising multiple cooling plates 92 (see FIGS. 30 and 31). Collection spindles 88 and cooling plate stack 90 are arranged generally equidistant to rotating platform 82 so collection swing arm 86 only requires rotational movement to pick up or release a finished record or a cooling plate from/into the desired position.

Collection swing arm 86 has a linear stacking mode, where finished records are stacked onto one collection spindle 88 until that collection spindle is full before stacking finished records onto the other collection spindle. Collection swing arm 86 also has a sequential stacking mode, where finished records are stacked sequentially or alternately between collection spindles 88 to provide each finished record more time to cool before the next finished record is stacked on top.

Collection swing arm 86 also picks up cooling plates 92 from cooling plate stack 90 to release onto collection spindles 88. In this way, collection swing arm 86 can alternately stack finished records and cooling plates 92 onto any collection spindle 88 (see FIG. 32).

Whereas a specific embodiment is shown and described, it will be understood that variants are possible.

For example, formation of a puck on demand by the operator can be initiated by pressing and holding two pushbuttons simultaneously to start extruding a puck from outlet 16.

Figure 21:
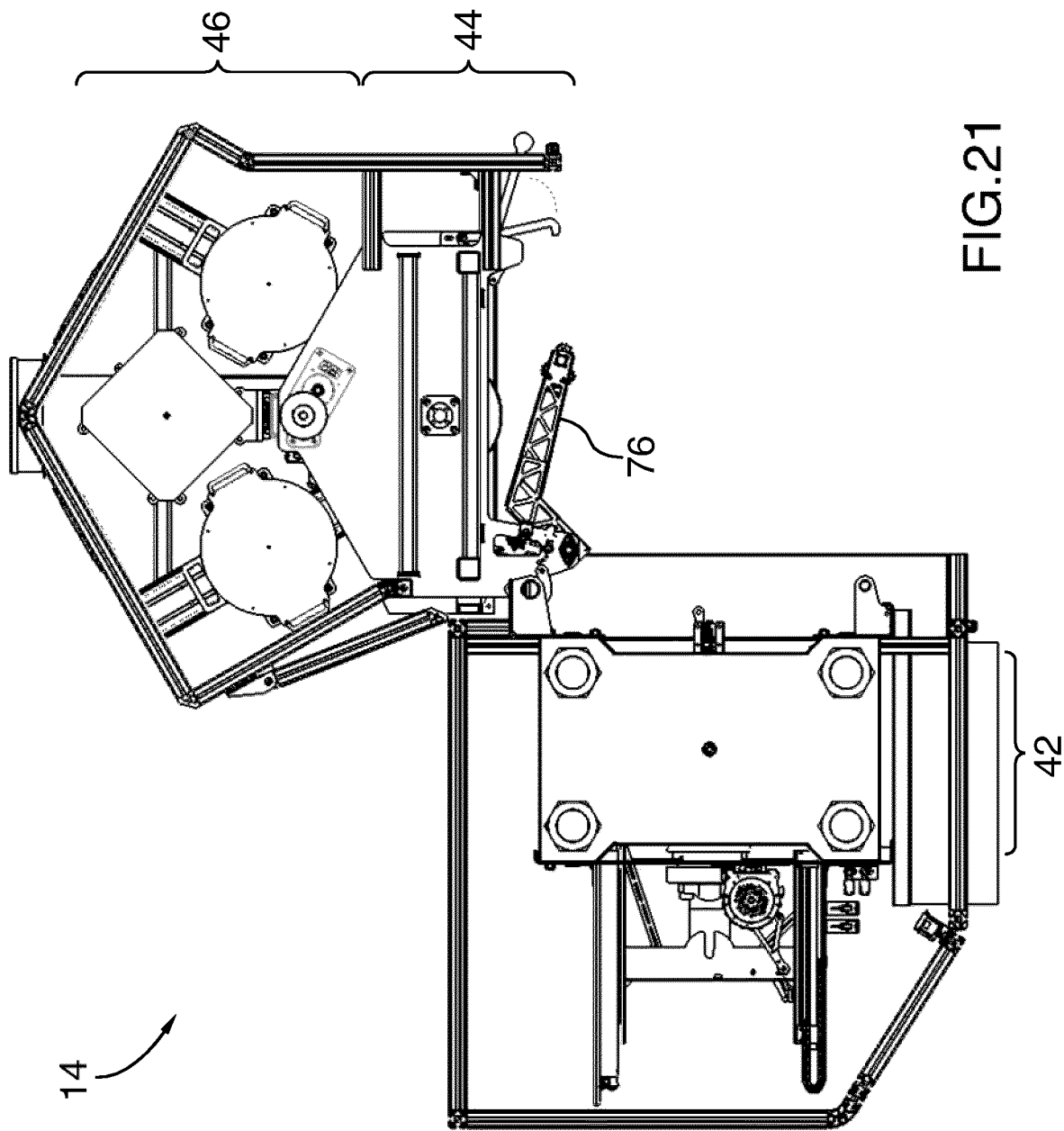
FIG. 21 is a view of the system of FIG. 8 in a stamper or mould-change position.

In another variant, the system can be operated in a semi-automated mode with the trimming subsystem 44 in the mould-change position shown in FIG. 21. In this mode, the operator manually moves the records from the mould to the trimming system. An advantage of this mode is that the operator can carry out manipulations within the mould, such as the placement of Mylar sheets, for the production of picture discs. For example, the operator can call for a half-sized puck; can call for the mould to be closed; after the mold opens automatically after forming, the operator can place, for example, a Mylar sheet onto the flattened half-size puck; thereafter, the operator can call for a second half-sized puck, and thereafter, can call for the mold to be closed. Similarly, the operator can call for a record, that he or she has manually placed upon the trimming system, to be automatically trimmed and stacked by the subsystem. The operator can be safeguarded in any conventional manner, such as requiring two pushbuttons to be held simultaneously before machinery commences movement.

Accordingly, the invention should be understood to be limited only by the accompanying claims, purposively construed.

The invention claimed is:

1. A record making system comprising:
   a puck former movable between an automatic position and a semi-automatic position, the puck former having an outlet and adapted to periodically produce and deliver a puck to the outlet;
   a record former having a puck receiver and adapted, upon delivery of the puck to the puck receiver, to automatically produce a record, and the record former positioned relative to the puck former and adapted such that,
   when the puck former is in the automatic position, the outlet of the puck former is coterminous with the puck receiver of the record former, and
   when the puck former is in the semi-automatic position, the puck receiver is accessible by an operator to permit manual puck feeding; and
   the record former having a trimming subsystem and a press subsystem, wherein the trimming subsystem is pivotally connected to the press subsystem for pivotal movement between an active position, wherein the trimming subsystem is operatively connected to the press subsystem, and a mould-change position, wherein the trimming subsystem is spaced apart from the press subsystem in an inoperative position to permit access to moulds of the press subsystem.

2. The system according to claim 1, wherein when the puck former is in the semi-automatic position, the puck former is spaced apart from the record former.

3. The system according to claim 2, wherein the system further includes rails upon which the puck former is mounted for sliding movement of the puck former between the automatic and semi-automatic position and for maintaining relative alignment between the puck former and the record former.

4. The system according to claim 3, wherein in use, the puck former automatically forms the puck when the puck former is in the automatic position, and the puck former forms the puck on demand when the puck former is in the semi-automatic position.

5. The system according to claim 4, wherein the puck former comprises a hopper subsystem and a melting subsystem, the hopper subsystem having a hopper with a pellet outlet and a release port, the hopper moveable between a working position, wherein the hopper is vertically oriented and the pellet outlet is in communication with the melting system, and an emptying position, wherein the hopper is tilted away from its vertical orientation and the pellet outlet is in communication with the release port for emptying the hopper of resin pellets without the resin pellets going through the melting subsystem, wherein a latch releasably locks the hopper in the working position and the emptying position.

6. The system according to claim 4, wherein the record former comprises a label cartridge terminating at an open end and having a cavity adapted to hold a stack of labels, the label cartridge further having a platform within the cavity being moveable towards the open end, wherein in use with the stack of labels, the platform moves the stack of labels towards the open end.

7. The system according to claim 6, wherein the record maker and label cartridge each having a cartridge interengageable component which collectively define a cartridge quick release mechanism for releasably coupling the label cartridge to the record former without tools.

8. The system according to claim 1, wherein the mould has a stamper and mould locking components engageable with the record former, which define a quick release mechanism for releasably coupling the stamper to the record former.

9. The system according to claim 8, wherein the mould locking components comprise a clamp ring, a centre bushing, and a locking mechanism.

10. The system according to claim 4, wherein the record former further comprises a cooling subsystem operatively coupled to the trimming subsystem, the cooling subsystem comprising multiple collection spindles and a stacking mechanism adapted to lift the finished record from the trimming subsystem and to release a finished record onto any one of the multiple collection spindles.

11. A record making system, comprising:
   a puck former movable between an automatic position and a semi-automatic position, the puck former having an outlet and adapted to periodically produce and deliver a puck to the outlet;
   a record former having a puck receiver and adapted, upon delivery of the puck to the puck receiver, to automatically produce a record, and the record former positioned relative to the puck former and adapted such that,
   when the puck former is in the automatic position, the outlet of the puck former is coterminous with the puck receiver of the record former, and
   when the puck former is in the semi-automatic position, the puck receiver is accessible by an operator to permit manual puck feeding; and
   wherein the cooling subsystem has a linear stacking mode, wherein multiple finished records are consecutively stacked onto one of the multiple collection spindles, and a sequential stacking mode, wherein multiple finished records are stacked sequentially on the multiple collection spindles.

12. The system according to claim 11, wherein the cooling subsystem further comprises a stack of cooling plates, the stacking mechanism further adapted to lift a cooling plate from the stack of cooling plates and to release the cooling plate onto any one of the multiple collection spindles.

13. The system according to claim 12, wherein the stacking mechanism comprises a swing arm having a vacuum suction component for gripping and releasing the finished records or cooling plates.

* * * * *